(12) United States Patent
Nayaknur

(10) Patent No.: US 11,588,411 B1
(45) Date of Patent: Feb. 21, 2023

(54) INPUT VOLTAGE ESTIMATION FOR A POWER CONVERTER

(71) Applicant: POWER INTEGRATIONS, INC., San Jose, CA (US)

(72) Inventor: Akshay Nayaknur, Sunnyvale, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 0 days.

(21) Appl. No.: 17/540,524

(22) Filed: Dec. 2, 2021

(51) Int. Cl.
  *H02M 3/335* (2006.01)
  *H02M 1/00* (2006.01)
  *H02M 1/08* (2006.01)

(52) U.S. Cl.
  CPC ..... *H02M 3/33592* (2013.01); *H02M 1/0012* (2021.05); *H02M 1/083* (2013.01)

(58) Field of Classification Search
  CPC ........... H02M 3/33592; H02M 1/0012; H02M 1/083; H02M 3/33576; H02M 3/335; H02M 1/0003
  See application file for complete search history.

(56) References Cited

U.S. PATENT DOCUMENTS

| | | | |
|---|---|---|---|
| 6,795,321 B2 | 9/2004 | Balakrishnan et al. |
| 7,061,778 B2 | 6/2006 | Odell et al. |
| 7,414,862 B2 | 8/2008 | Park |
| 7,502,236 B2 | 3/2009 | Baurle et al. |
| 7,923,973 B2 | 4/2011 | Odell |
| 8,004,262 B2 | 8/2011 | Saint-Pierre |
| 8,040,705 B2 | 10/2011 | Mayell |
| 8,077,483 B2 | 12/2011 | Djenguerian et al. |
| 8,144,487 B2 | 3/2012 | Djenguerian et al. |
| 8,222,882 B2 | 7/2012 | Balakrishnan et al. |
| 8,717,785 B2 | 5/2014 | Gaknoki et al. |
| 8,779,827 B2 | 7/2014 | Kung |
| 8,847,805 B1 | 9/2014 | Schulz |
| 8,929,102 B2 | 1/2015 | Zhang |
| 8,964,412 B2 | 2/2015 | Mao |
| 9,071,146 B2 | 6/2015 | Matthews et al. |
| 9,136,765 B2 | 9/2015 | Balakrishnan et al. |

(Continued)

FOREIGN PATENT DOCUMENTS

| WO | 2020219116 A1 | 10/2020 |
| WO | 2021183882 A2 | 9/2021 |
| WO | 2021194838 A1 | 9/2021 |

*Primary Examiner* — Adolf D Berhane
(74) *Attorney, Agent, or Firm* — COJK/Power Integrations, Inc.

(57) ABSTRACT

An input voltage estimate circuit for use in a power converter. The input voltage estimate circuit comprises a timer, which comprises a timer control circuit to generate a control signal in response to a request signal, a winding signal, and an output voltage signal. The control signal is coupled to transition to a first logic level in response to a request event in the request signal, and to transition to a second logic level in response to the winding signal falling below the output voltage signal. The timer comprises a primary conduction timer to generate a primary conduction time signal in response to the first logic level and the second logic level in the control signal and a secondary conduction timer to generate a secondary conduction time signal in response to the second logic level in the control signal and a second logic level in a second drive signal.

22 Claims, 9 Drawing Sheets

(56) References Cited

U.S. PATENT DOCUMENTS

| | | |
|---|---|---|
| 9,166,486 B2 | 10/2015 | Matthews et al. |
| 9,312,777 B2 | 4/2016 | Lefedjiev et al. |
| 9,368,961 B2 | 6/2016 | Espino |
| 9,374,011 B2 | 6/2016 | Liu et al. |
| 9,401,657 B2 | 7/2016 | Wang et al. |
| 9,444,357 B1 | 9/2016 | Matthews et al. |
| 9,502,985 B2 * | 11/2016 | Werner ............. H02M 3/33592 |
| 9,680,383 B2 | 6/2017 | Mao et al. |
| 9,742,288 B2 | 8/2017 | Balakrishnan et al. |
| 9,780,666 B2 | 10/2017 | Odell et al. |
| 10,298,110 B2 | 5/2019 | Pham et al. |
| 10,418,908 B1 | 9/2019 | Pastore et al. |
| 10,554,136 B1 | 2/2020 | Miletic |
| 10,763,756 B2 | 9/2020 | Mayell et al. |
| 10,797,583 B2 | 10/2020 | Mayell et al. |
| 10,826,398 B2 | 11/2020 | Wang et al. |
| 11,081,964 B2 * | 8/2021 | Balakrishnan .... H02M 3/33507 |
| 11,283,343 B2 * | 3/2022 | Deng ...................... H02M 1/36 |
| 2022/0190703 A1 | 6/2022 | Pastore |

\* cited by examiner

INPUT VOLTAGE ESTIMATION FOR A POWER CONVERTER

BACKGROUND INFORMATION

Field of the Disclosure

The present invention relates generally to power converters, and more particularly, to controllers for power converters.

Background

Electronic devices use power to operate. Switched mode power converters are commonly used due to their high efficiency, small size, and low weight to power many of today's electronics. Conventional wall sockets provide a high voltage alternating current. In a switching power converter, a high voltage alternating current (ac) input is converted to provide a well-regulated direct current (dc) output through an energy transfer element. The switched mode power converter controller usually provides output regulation by sensing one or more signals representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

In addition to one or more output quantities, the input voltage of the switched mode power converter may be sensed and used by the controller to vary its operating conditions. For example, the controller may vary the value to which the output voltage is regulated depending on if the input voltage is high line or low line. In another example, the controller may vary the switching conditions of the power switch depending on the value of the input voltage to consider the thermal conditions at the sensed input voltage.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1A:
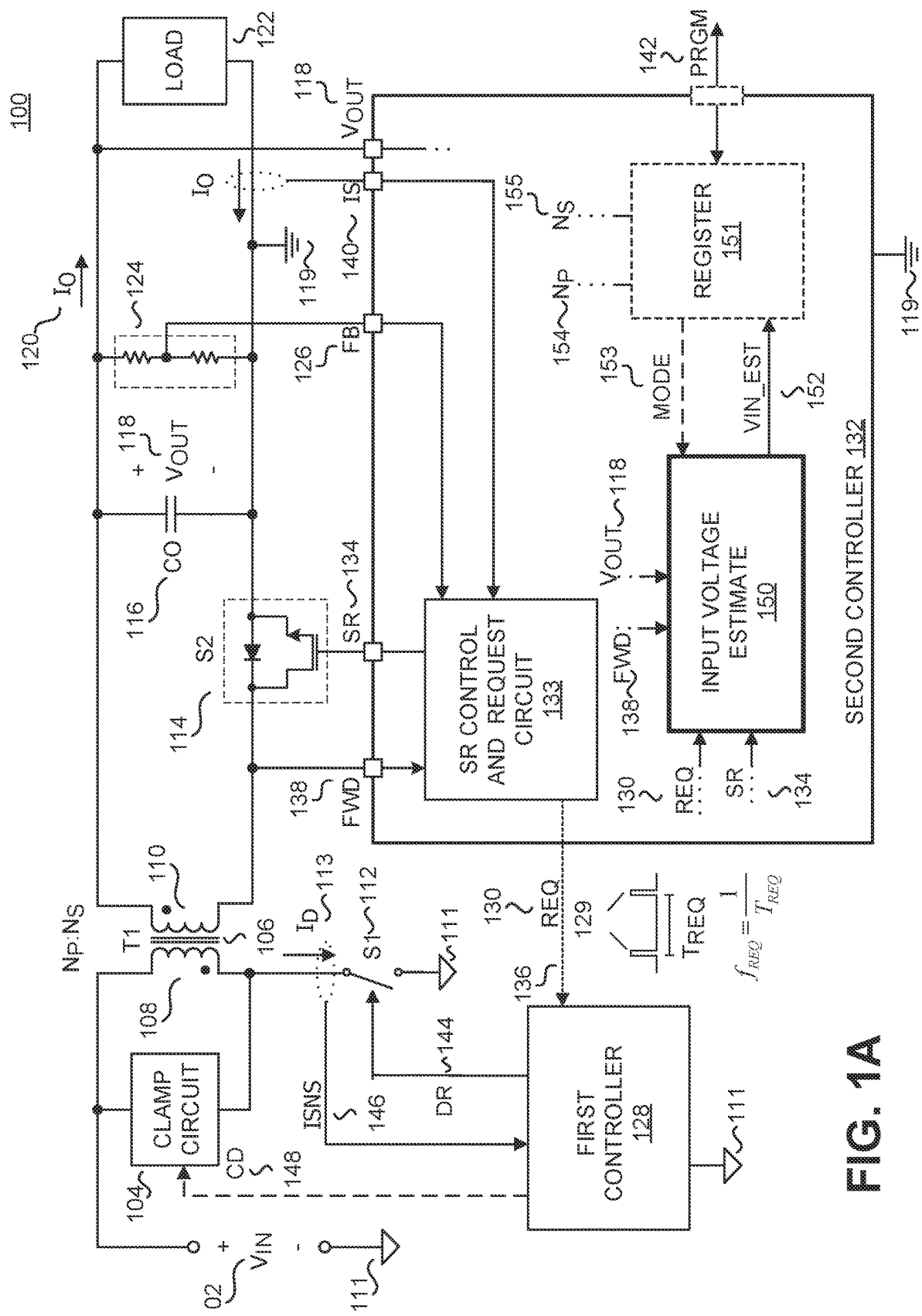
FIG. 1A illustrates an example of a power converter with a controller including an example input voltage estimate circuit in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Isolated power converters generally have an input-side (also referred to as a primary-side) and an output-side (also referred to as a secondary-side) which are galvanically isolated from each other. Circuits coupled to the input-side of the power converter are referenced to an input return while circuits coupled to the output-side of the power converter are referenced to an output return. The input return and output return are also galvanically isolated. Since the input-side is galvanically isolated from the output-side, there is no direct (dc) current path across the isolation barrier of the power converter. Power converters may utilize energy transfer elements, with input windings and output windings, such as a transformer or coupled inductor to maintain the isolation.

A controller coupled to the input-side of the power converter generally has direct access to the input voltage $V_{IN}$ of the power converter. A controller coupled to the output-side of the power converter has indirect access to the input voltage $V_{IN}$. For example, the output winding voltage is the product of the energy transfer element turns ratio and the input voltage $V_{IN}$ while the power switch of the power converter is conducting. An output-side coupled controller may therefore sample the output winding voltage and determine the input voltage $V_{IN}$. However, since the output winding voltage is representative of the input voltage when the power switch is conducting, the sampling of the output winding voltage should be a fast sample and may also require a high voltage devices or accurate resistors. Accurate resistors use more area of an integrated circuit compared to a less accurate resistor.

However, volt-second balance of an inductor provides a relationship between the input voltage $V_{IN}$, output voltage $V_{OUT}$, energy transfer element turns ratio, power switch conduction time ($T_{ON}$), and secondary conduction time ($T_{SR}$). As such, embodiments of the present disclosure measure the power switch conduction time ($T_{ON}$) and a secondary conduction time ($T_{SR}$) to estimate the input voltage $V_{IN}$ of the power converter. In various examples, the estimated input voltage $V_{IN}$ of the power converter may then be stored and/or utilized to vary the output power of the power converter.

To illustrate, FIG. 1A shows an example of a switched mode power converter 100 that includes a first controller 128 (e.g., a primary controller) and a second controller 132 (e.g., a secondary controller) including an input voltage estimate circuit 150 in accordance with an embodiment of the present disclosure. The illustrated power converter 100 further includes a clamp circuit 104, energy transfer element T1 106, an input winding 108 of the energy transfer element T1 106 with $N_P$ number of turns, an output winding 110 of the energy transfer element T1 106 with $N_S$ number of turns, a power switch S1 112, an input return 111, an output rectifier S2 114, an output capacitor CO 116, and a sense circuit 124 coupled across the output capacitor CO 116. In the depicted example, sense circuit 124 is exemplified as a resistor divider that is configured to generate a feedback signal FB 126 as shown. Further shown in FIG. 1A are an input voltage $V_{IN}$ 102, a drain current ID 113, an output voltage $V_{OUT}$ 118, an output current Jo 120, a request signal REQ 130, a second drive signal SR 134, an output current sense IS 140, a first drive signal DR 144, and a current sense signal ISNS 146.

In the illustrated example, the power converter 100 is shown as having a flyback topology. Further, the input of power converter 100 is galvanically isolated from the output of the power converter 100 such that input return 111 is galvanically isolated from output return 119. Since the input and the output of power converter 100 are galvanically isolated, there is no direct current (dc) path across the isolation barrier of energy transfer element T1 106, or between input winding 108 and output winding 110, or between input return 111 and output return 119. It is appreciated that other known topologies and configurations of power converters may also benefit from the teachings of the present disclosure.

The power converter 100 provides output power to a load 122 from an unregulated input voltage $V_{IN}$ 102. In one embodiment, the input voltage $V_{IN}$ 102 is a rectified and filtered ac line voltage. In another embodiment, the input voltage $V_{IN}$ 102 is a dc input voltage. The input voltage $V_{IN}$ 102 is coupled to the energy transfer element 106. In some examples, the energy transfer element 106 may be a coupled inductor, a transformer, or an inductor. The energy transfer element 106 is shown as including two windings, input winding 108 (which may also be referred to as a primary winding) with $N_P$ number of turns and output winding 110 (which may also be referred to as a secondary winding) with $N_S$ number of turns. However, the energy transfer element 106 may have more than two windings. The input winding 108 of the energy transfer element is further coupled to the power switch S1 112, and the power switch S1 112 is further coupled to input return 111. Coupled across the input winding 108 is the clamp circuit 104. The clamp circuit 104 limits the maximum voltage on the power switch S1 112. In various examples, the clamp circuit 104 may be an active clamp circuit and include a switch.

Output winding 110 is coupled to the output rectifier S2 114, which is an output rectifier exemplified as a switch or transistor used as a synchronous rectifier. However, the output rectifier S2 114 may also be exemplified as a diode. Output capacitor CO 116 is shown as being coupled to the output rectifier S2 114 and the output return 119. The power converter 100 further includes circuitry to regulate the output voltage $V_{OUT}$ 118, output current Jo 120, or a combination of the two. A second controller 132 is configured to sense the feedback signal FB 126, which is representative of the output of the power converter 100.

As shown in the example depicted in FIG. 1A, second controller 132 is coupled to receive a feedback signal FB 126 representative of the output voltage $V_{OUT}$ 118 of the power converter 100, an output current sense signal IS 140 representative of the output current Jo 120, the output voltage $V_{OUT}$ 118, and a winding signal FWD 138 that is representative of the output winding 110 of the energy transfer element T1 106. It should be appreciated that these inputs are exemplary and more or less inputs may be received by the second controller 132 depending on the application of the power converter 100.

Second controller 132 includes an SR control and request circuit 133 and an input voltage estimate circuit 150. The second controller 132 may optionally include a register 151 and a program terminal PRGM 142, which are illustrated in dashed lines in the example depicted in FIG. 1A. As will be further discussed, the second controller 132 may receive a program signal via program terminal PRGM 142 which can provide information, program, and/or trim parameters of the second controller 132. For example, the second controller 132 may receive information regarding the number of turns $N_P$ 154 of the input winding 108 and the number of turns $N_S$ 155 of the output winding 110. The second controller 132 may also receive a mode signal MODE 153 which is representative of the second controller 132 operating in a first mode or a second mode. The program signals may be signals received from a user. In one embodiment, a user may couple a component with variable values, such as a resistor or capacitor, to the program terminal PRGM 142 to convey information, program, and/or trim to the second controller 132. In another embodiment, the program signal may be received from a third controller, such as a microcontroller via an inter-integrated (I2C) bus. Communication through the program terminal PRGM 142 may adhere to the I2C protocol. Alternatively, communications may adhere to the Universal Asynchronous Receiver/Transmitter (UART) protocol. The register 151 may be utilized to store the received information in the second controller 132.

SR control and request circuit 133 is shown as receiving the winding signal FWD 138 and feedback signal FB 126. The SR control and request circuit 133 is also shown as receiving the output current sense signal IS 140. In the depicted example, the SR control and request circuit 133 outputs a second drive signal SR 134 in response to the winding signal FWD 138. The second drive signal SR 134 is received by the output rectifier S2 114 and controls the turn ON and turn OFF of the output rectifier S2 114. In one example, in response to the feedback signal FB 126, the SR control and request circuit 133 outputs a request signal REQ 130. The request signal REQ 130 is representative of a request to turn on the power switch S1 112. The request signal REQ 130 may include request events 129 which are generated in response to the comparison of the feedback signal FB 126 to a regulation reference. The regulation reference is generally representative of the value to which the first controller 128 and second controller 132 regulate the output of the power converter 100. The request signal REQ 130 may be a rectangular pulse waveform which pulses to a logic high value and quickly returns to a logic low value. The logic high pulses may be referred to as request events 129. The request signal REQ 130 and request events may also be provided in response to the output current sense signal IS 140 or a combination of the output current IS 140 and the feedback signal FB 126. As shown, the SR control and request circuit 133 is coupled to output the request signal REQ 130 to the first controller 128.

In various examples, the request signal REQ 130 is sent to the first controller 128 through a communication link 136 which maintains galvanic isolation between the first controller 128 and second controller 132. To illustrate, for the example shown in FIG. 1A, the second controller 132 is coupled to the secondary side of the power converter 100 and is referenced to the output return 119 while the first controller 128 is coupled to the primary side of the power converter 100 and is referenced to the input return 111. In embodiments, the first controller 128 and the second controller 132 are galvanically isolated from one another and the communication link 136 maintains the galvanic isolation between the first controller 128 and the second controller 132 by using for example an inductive coupling, such as a transformer or a coupled inductor, an optocoupler, capacitive coupling, or other device that maintains the galvanic isolation. However, it should be appreciated that in some embodiments, the second controller 132 is not galvanically isolated from the first controller 128. In one example, the communication link 136 may be an inductive coupling formed from a leadframe which supports the first controller 128 and/or the second controller 132.

In the depicted example, input voltage estimate circuit 150 is shown as receiving the request signal REQ 130, second drive signal SR 134, winding signal FWD 138, and the output voltage $V_{OUT}$ 118 and outputs an input voltage estimate signal VIN_EST 152. In one embodiment, the input voltage estimate circuit 150 may also receive the number of primary turns $N_P$ 154 and the number of secondary turns $N_S$ 155. As will be further discussed, the input voltage estimate circuit 150 may also optionally receive a mode signal MODE 153 representative of an operational mode of the second controller 132. For example, the second controller 132 may operate in a first mode or a second mode. The first mode may be a quasi-resonant (QR) mode and the second mode may be a zero-voltage (ZV) switching mode.

In operation, the input voltage estimate circuit 150 determines the primary conduction time $T_{ON}$, which may be representative of the duration of time which the power switch S1 112 is conducting, and the secondary conduction time $T_{SR}$, which may be representative of the duration of time which the output rectifier S2 114 is conducting, and utilizes the volt-second balance of the energy transfer element T1 106 to estimate the input voltage $V_{IN}$ 102. Per the volt-second balance of the energy transfer element T1 106, an estimate (e.g., VIN_EST) of the input voltage $V_{IN}$ 102 is substantially the product of the number of primary turns $N_P$, output voltage $V_{OUT}$ 118, and secondary conduction time $T_{SR}$ divided by the product of the number of secondary turns $N_S$ and the primary conduction time $T_{ON}$, or mathematically:

$$\text{VIN\_EST} = \frac{N_P V_{OUT} T_{SR}}{N_S T_{ON}} \qquad (1)$$

Input voltage estimate circuit 150 utilizes the request signal REQ 130, winding signal FWD 138, and the output voltage $V_{OUT}$ 118 to determine the primary conduction time $T_{ON}$ (which may also be referred to as the on-time of the power switch S1 112) and the secondary conduction time $T_{SR}$. The input voltage estimate circuit 150 may also utilize the second drive signal SR 134 to determine the secondary conduction time $T_{SR}$. The second controller 132 measures the primary conduction time $T_{ON}$ as the duration of time between a request event 129 in the request signal REQ 130 and the winding signal FWD 138 falling below the output voltage $V_{OUT}$ 118. The second controller 132 measures the secondary conduction time $T_{SR}$ as the duration of time between the winding signal FWD 138 falling below the output voltage $V_{OUT}$ 118 and the second drive signal SR 134 controlling the output rectifier S2 114 OFF. The second drive signal SR 134 controls the output rectifier S2 114 OFF when the winding signal FWD 138 increases above a turn-off threshold SR_OFF or if the SR control and request circuit 133 determines to send a request event 129 in the request signal REQ 130. As such, in one example the second controller 132 measures the secondary conduction time $T_{SR}$ as the duration of time between the winding signal FWD 138 falling below the output voltage $V_{OUT}$ 118 and the winding signal FWD 138 subsequently increasing above the turn-off threshold SR_OFF. Once the input voltage estimate circuit 150 has measured the primary conduction time $T_{ON}$ and the secondary conduction time $T_{SR}$, the input voltage estimate circuit 150 calculates the estimated input voltage VIN_EST 152 utilizing the measured primary conduction time $T_{ON}$ and the secondary conduction time $T_{SR}$, the output voltage $V_{OUT}$ 118, and the number of primary turns $N_P$ 154 and the number of secondary turns $N_S$ 155 per the volt-second balance of equation (1).

The estimated input voltage VIN_EST 152 may be provided to the register 151 to be stored. The second controller 132 can provide the estimated input voltage VIN_EST 152 external to the second controller 132 via the program terminal PRGM 142. In one example, the estimated input voltage VIN_EST 152 is provided to a user and/or a third controller. In response to the estimated input voltage VIN_EST 152, the second controller 132, the user and/or the third controller can vary the output power of the power converter 100. In another example, the estimated input voltage VIN_EST 152 may be provided to the SR control and request circuit 133.

In one example, the first controller 128 and second controller 132 may be formed as part of an integrated circuit that is manufactured as either a hybrid or monolithic integrated circuit. In one example, the power switch S1 112 may also be integrated in a single integrated circuit package with the first controller 128 and the second controller 132. In addition, in one example, first controller 128 and second controller 132 may be formed as separate integrated circuits. The power switch S1 112 may also be integrated in the same integrated circuit as the first controller 128 or could be formed on its own integrated circuit. Further, it should be appreciated that both the first controller 128, the second controller 132, and power switch S1 112 need not be included in a single package and may be implemented in separate controller packages or a combination of combined/separate packages.

In one example, the power switch S1 112 may be a transistor such as a metal-oxide-semiconductor field-effect transistor (MOSFET), a bipolar junction transistor (BJT), an insulated-gate bipolar transistor (IGBT), a gallium nitride (GaN) based transistor, or a silicon carbide (SiC) based transistor. In another example, the power switch S1 112 may be a cascode switch including a normally-on first switch and a normally-off second switch coupled together in a cascode configuration. The first switch may generally be a GaN or SiC based transistor while the second switch may be a MOSFET, BJT, or IGBT.

The first controller 128 is coupled to receive a current sense signal ISNS 146 representative of the drain current ID 113 of the power switch S1 112, the request signal REQ 130 or feedback signal FB 126 through the communication link 136, and outputs the first drive signal DR 144. The first controller 128 provides the first drive signal DR 144 to the power switch S1 112 to control various switching parameters of the power switch S1 112 to control the transfer of energy from the input of to the output of the power converter 100 through the energy transfer element 106. Examples of such various switching parameters of the power switch S1 112 include switching frequency (or switching period TSW), duty cycle, on-time and off-times, or varying the number of pulses per unit time of the power switch S1 112. In addition, the power switch S1 112 may be controlled such that it has a fixed switching frequency or a variable switching frequency.

In one embodiment, the first controller 128 outputs the first drive signal DR 144 to control the conduction of the power switch S1 112. In one example, the first controller 128 outputs the first drive signal DR 144 to turn ON the power switch S1 112 in response to a request event 129 in the request signal REQ 130 or to the information provided by the feedback signal FB 126. In another example, the first controller 128 outputs the first drive signal DR 144 to turn OFF the power switch S1 112 when the drain current ID 113 provided by the current sense signal ISNS 146 reaches a current limit. It should be appreciated that other control methods could be used.

Figure 1B:
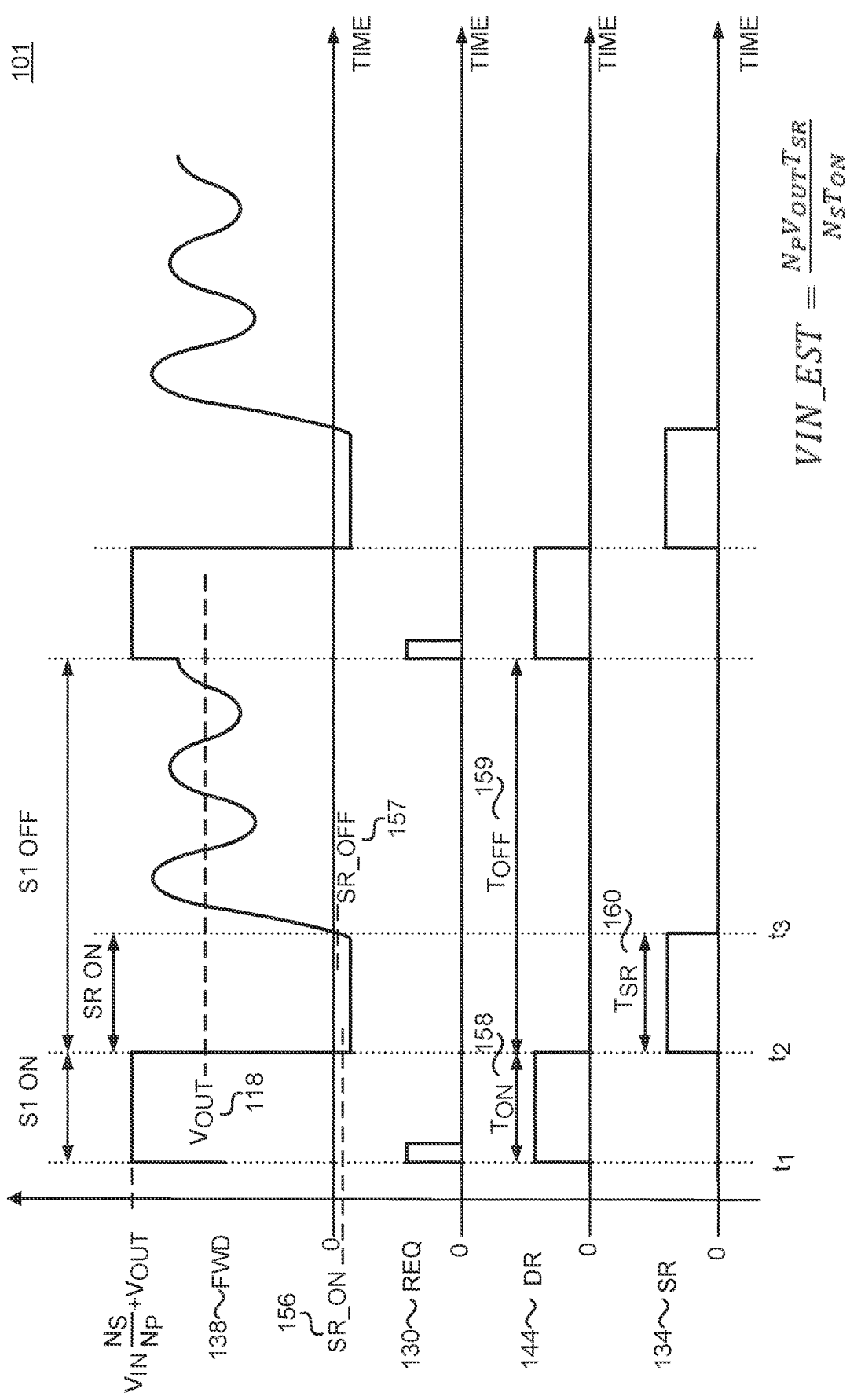
FIG. 1B illustrates waveforms found in a power converter including a controller with an example input voltage estimate circuit in accordance with the teachings of the present invention.

FIG. 1B illustrates an example timing diagram 101 of waveforms found in a switched mode power converter including a controller with an example input voltage estimate circuit in accordance with the teachings of the present invention. As shown, FIG. 1B illustrates example waveforms for the winding signal FWD 138, request signal REQ 130, first drive signal DR 144 which controls the turn ON and turn OFF of the power switch S1 112, and second drive signal SR 134 which controls the turn ON and turn OFF of the output rectifier S2 114. The waveforms are shown to illustrate the ability for the second controller 132 to estimate the input voltage $V_{IN}$ 102 using the conduction time $T_{ON}$ 158 of the power switch S1 112 and the conduction time $T_{SR}$ 160 of the output rectifier S2 114. Further, the winding signal FWD 138 is illustrated as a voltage.

In operation, an example power converter may operate in continuous conduction mode (CCM) or discontinuous conduction mode (DCM). The switch utilized for the output rectifier S2 114 is conducting (e.g., transferring energy to the output) during at least a portion of the off-time of the power switch S1 112. During CCM, the current in the output winding 110 of the energy transfer element T1 106 does not reach zero before the power switch S1 112 turns ON. As such, the output rectifier S2 114 is actively turned OFF to stop conduction prior to the power switch S1 112 turning ON. During DCM, the current in the output winding 110 reaches zero before the power switch S1 112 is turned ON and the output rectifier S2 114 stops conducting before the turning ON of the power switch S1 112. As such, ringing occurs on the output winding 110 (which may also be referred to as a relaxation ring) due to the secondary parasitic inductances and capacitances during DCM. Each peak of the relaxation ring on the output winding 110 represents a valley point of the power switch voltage, and vice versa. The peaks and valleys may be referred to as extremum. As used herein, "extremum" or "extrema" includes any local maximum or minimum points or may be referred to as "peaks" and "valleys," where mathematically, the slope (i.e., derivative of the ringing/oscillation waveform) approaches zero.

As will be discussed further, the second controller 132 may operate in a first mode or a second mode. The first mode may be quasi-resonant (QR) mode and the second mode may be a zero-voltage (ZV) switching mode and operation in QR or ZV mode includes synchronizing the turn ON of switches of the power converter with an extremum in the relaxation ring of the winding signal FWD 138.

The waveforms illustrated in FIG. 1B illustrates a power converter operating in DCM. At time $t_1$, a request event (e.g., pulse) occurs in the request signal REQ 130. As such, the first drive signal DR 144 transitions to a logic high value to turn ON the power switch S1 112. When the power switch S1 112 is conducting, the winding signal FWD 138 is substantially equal to the input voltage $V_{IN}$ 102 multiplied by the turns ratio between the output winding 110 and the input winding 108 plus the output voltage $V_{OUT}$ 118, or mathematically:

$$V_{IN}\frac{N_S}{N_P} + V_{OUT}.$$

Between times $t_1$ and $t_2$, the power switch S1 112 is ON and the duration of time between time $t_1$ and time $t_2$ is the power switch conduction time $T_{ON}$ 158.

At time $t_2$, the first drive signal DR 144 transitions to a logic low value to turn OFF the power switch S1 112. Once the power switch S1 112 stops conducting, the winding signal FWD 138 decreases. Once the winding voltage reaches the on threshold SR_ON 156, the second controller 132 controls the output rectifier S2 114 ON. As shown, the second drive signal SR 134 transitions to a logic high value to turn ON the output rectifier S2 114. In one embodiment, the on threshold SR_ON 156 is selected to be a voltage to confirm that conduction has begun through the body diode of the output rectifier S2 114 or any parallel diode across the output rectifier S2 114. In one example, the on threshold SR_ON 156 is substantially 100 mV below output return (e.g., −100 mV).

The winding signal FWD 138 begins to increase and reaches the off threshold SR_OFF 157 at time t₃. When the winding signal FWD 138 increases and reaches the off threshold SR_OFF 157, this indicates that the current of the output winding 110 has reached zero and the output rectifier S2 114 is no longer conducting. The off threshold SR_OFF 157 is representative of the value of the winding signal FWD 138 when no current is present in the output winding 110. In examples, the off threshold SR_OFF 157 may be substantially −3 mV or −6 mV. The duration which the output rectifier S2 114 is ON and conducting may be referred to as the secondary conduction time $T_{SR}$ 160. It should be appreciated that there is a delay between the power switch S1 112 turning OFF and the winding signal FWD falling below the output voltage $V_{OUT}$ 118 and the winding signal FWD 138 further falling below the off threshold SR_OFF 157, which is not shown. In one embodiment, the secondary conduction time $T_{SR}$ 160 is estimated as the duration of time between the winding signal FWD 138 falling below the output voltage $V_{OUT}$ 118 and the second drive signal SR 134 turning the output rectifier S2 114 OFF. For DCM, the secondary conduction time $T_{SR}$ 160 is estimated as the duration of time between the winding signal FWD 138 falling below the output voltage $V_{OUT}$ 118 and the winding signal FWD 138 rising above the off threshold SR_OFF 157. At time t₃, the second drive signal SR 134 transitions to a logic low value and the output rectifier S2 114 is OFF. The power switch S1 112 does not turn ON until another request event is received in the request signal REQ 130. For the example shown in FIG. 1B, the request event and turn ON of the power switch S1 coincides with an extremum of the relaxation ring in winding signal FWD 138. However, it should be appreciated that the request event and turn ON of the power switch S1 may not coincide with an extremum of the relaxation ring of winding signal FWD 138

While the power switch S1 112 is conducting, the winding signal FWD 138 is substantially equal to the input voltage $V_{IN}$ 102 multiplied by the turns ratio between the output winding 110 and the input winding 108 plus the output voltage $V_{OUT}$ 118, or mathematically:

$$V_{IN} \frac{N_S}{N_P} + V_{OUT}.$$

Utilizing the volt-second balance of an inductor, the input voltage $V_{IN}$ 102 may be calculated and/or estimated using the power switch conduction time $T_{ON}$ 158, the secondary conduction time $T_{SR}$ 160, the output voltage $V_{OUT}$ 118, and the turns ratio between the input winding and the output winding of the energy transfer element as shown by equation (1).

Figure 2:
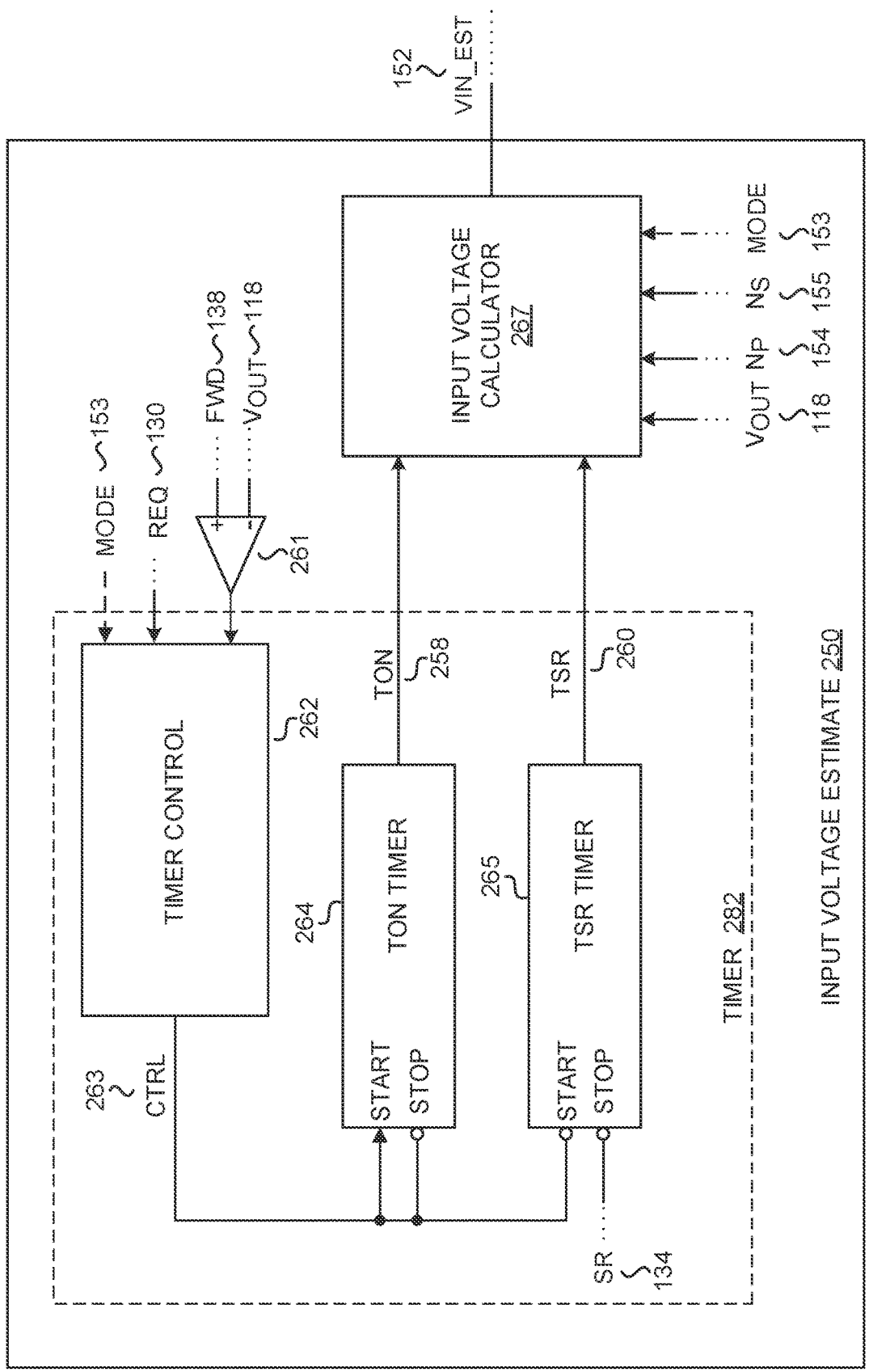
FIG. 2 illustrates a block diagram of an example input voltage estimate circuit in accordance with the teachings of the present invention.

FIG. 2 illustrates a block diagram of an example input voltage estimate circuit 250 in accordance with the teachings of the present invention. It is appreciated input voltage estimate circuit 250 of FIG. 2 may be an example of input voltage estimate circuit 150 included in second controller 132 as shown in FIG. 1, and that similarly named and numbered elements described above are coupled and function similarly below.

As shown in the example depicted in FIG. 2, the input voltage estimate circuit 250 includes a timer 282, an input voltage calculator 267, and comparator 261. Timer 282 is shown as receiving request signal REQ 130, the second drive signal SR 134, and the output of the comparator 261. Comparator 261 is coupled to receive the winding signal FWD 138 and the output voltage $V_{OUT}$ 118. For the example shown, the winding signal FWD 138 is a voltage signal. In one embodiment, the comparator 261 receives the winding signal FWD 138 at is non-inverting input and the output voltage $V_{OUT}$ 118 at its inverting input. Optionally, the timer 282 may also receive a mode signal MODE 153, as shown by the dashed lines. The timer 282 outputs the measured primary conduction time $T_{ON}$ 258 and secondary conduction time $T_{SR}$ 260 to the input voltage calculator 267.

In operation, the timer 282 begins measurement of the primary conduction time $T_{ON}$ 258 when a request event in the request signal REQ 130 is received and stops measurement of the primary conduction time $T_{ON}$ 258 when the winding signal FWD 138 falls below the output voltage $V_{OUT}$ 118. Or in other words, the primary conduction time $T_{ON}$ 258 is measured as the duration of time between a request event in the request signal REQ 130 and the subsequent winding signal FWD 138 falling below the output voltage $V_{OUT}$ 118. The timer 282 begins measurement of the secondary conduction time $T_{SR}$ 260 when the winding signal FWD 138 falls below the output voltage $V_{OUT}$ 118 and stops measurement when the second drive signal SR 134 controls the turn OFF of the output rectifier S2 114. Or in other words, the secondary conduction time $T_{SR}$ 260 is measured as the duration between the winding signal FWD 138 falling below the output voltage $V_{OUT}$ 118 and the second drive signal SR 134 indicating to turn OFF the output rectifier S2 114.

Timer 282 is shown as including a timer control 262, a primary conduction timer 264, and a secondary conduction timer 265. Timer control 262 is configured to receive the request signal REQ 130 and the output of comparator 261, e.g., the comparison result of the winding signal FWD 138 and the output voltage $V_{OUT}$ 118. In response to the request signal REQ 130 and the output of comparator 261, the timer control 262 outputs the control signal CTRL 263. In one embodiment, the control signal CTRL 263 is a rectangular pulse waveform with varying lengths of logic high and logic low sections. In operation, the control signal CTRL 263 transitions to a logic high value when a request event to turn on the power switch S1 112 in the request signal REQ 130 is received. The control signal CTRL 263 transitions to a logic low value when the winding signal FWD 138 falls below the output voltage $V_{OUT}$ 118 after the request event. The control signal CTRL 263 is utilized in part to control the primary conduction timer 264 and the secondary conduction timer 265. In particular, the control signal CTRL 263 is utilized to start and stop the primary conduction timer 264. The control signal CTRL 263 is also utilized to start the secondary conduction timer 265.

Primary conduction timer 264 receives the control signal CTRL 263 at its start and stop inputs. The small circle illustrated at the stop input of primary conduction timer 264 indicates that the stop input receives the inverted control signal CTRL 263. In operation, the primary conduction timer 264 begins measurement/timing at a leading edge of the control signal CTRL 263 and stops measurement at a trailing edge of the control signal CTRL 263. The output of the primary conduction timer 264 is the measured primary conduction time TON 258. In other words, the primary conduction timer 264 measures the primary conduction time TON 258 as the duration between a received request event indicating a request to turn on the power switch S1 112 and the subsequent winding signal FWD 138 falling below the output voltage $V_{OUT}$ 118.

Secondary conduction timer 265 receives the control signal CTRL 263 and the second drive signal SR 134. The second drive signal SR 134 is a rectangular pulse waveform with varying lengths of logic high and logic low sections. In one example, logic high sections represent controlling the output rectifier S2 114 ON while logic low sections represent controlling the output rectifier S2 114 OFF. The small circle illustrated at the start input of secondary conduction timer 265 indicates that the start input receives the inverted control signal CTRL 263 while the small circle illustrated at the stop input indicates that the stop input receives the inverted second drive signal SR 134. In operation, the secondary conduction timer 265 begins measurement/timing at a trailing edge of the control signal CTRL 263 and stops measurement at a trailing edge of the second drive signal SR 134. The output of the secondary conduction timer 265 is the measured secondary conduction time TSR 260. In other words, the secondary conduction timer 265 measures the secondary conduction time TSR 260 as the duration between the winding signal FWD 138 falling below the output voltage $V_{OUT}$ 118 and the second drive signal SR 134 controlling the output rectifier OFF.

Although a timer 282 is discussed, a counter may also be used for the primary conduction timer 264 or the secondary conduction timer 265. A counter would receive a clock signal and counts the number of clock events between the start and stop of the respective primary conduction timer 264 or secondary conduction timer 265. Further, the primary conduction timer 264 or the secondary conduction timer 265 may be implemented with a running average timer.

Input voltage calculator 267 receives the measured primary conduction time TON 258, measured secondary conduction time TSR 260, output voltage $V_{OUT}$ 118, number of primary turns $N_P$ 154, and number of secondary turns $N_S$ 155. Optionally, the input voltage calculator 267 may also receive the mode signal MODE 153 as indicated by the dashed lines. In response to the measured primary conduction time $T_{ON}$ 258, measured secondary conduction time $T_{SR}$ 260, output voltage $V_{OUT}$ 118, number of primary turns $N_P$ 154, and number of secondary turns $N_S$ 155, the input voltage calculator 267 utilizes volt-second balance and calculates the estimated input voltage $V_{IN}$ EST 152 per equation (1) above.

Figure 3A:
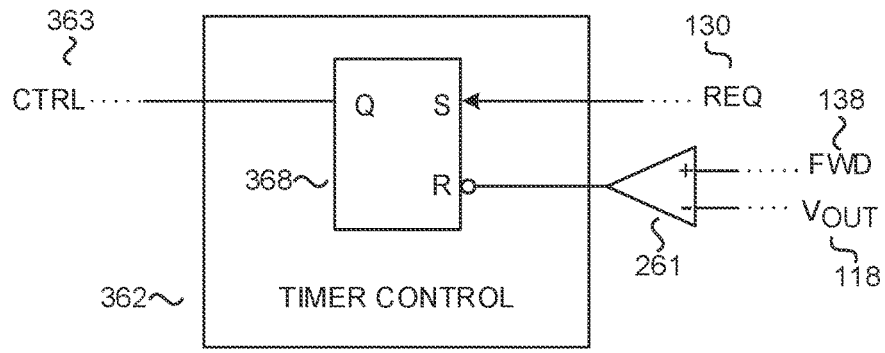
FIG. 3A illustrates a block diagram of an example timer control included in an example timer of an example input voltage estimate circuit in accordance with the teachings of the present invention.

FIG. 3A illustrates a block diagram of an example timer control 362 included in an example timer of an example input voltage estimate circuit in accordance with the teachings of the present invention. It is appreciated timer control 362 of FIG. 3A may be an example of timer control 262 as shown in FIG. 2, and that similarly named and numbered elements described above are coupled and function similarly below.

As shown in the example depicted in FIG. 3A, the control signal CTRL 363 transitions to a logic high value in response to the request signal REQ 130 requesting the power switch S1 112 to turn ON. For the example shown, a request event (e.g., pulse) is utilized to by the request signal REQ 130 to indicate a request to turn ON the power switch S1 112. The control signal CTRL 363 transitions to a logic low value when the winding signal FWD 138 falls below the output voltage $V_{OUT}$ 118. Therefore, in the depicted example, the control signal CTRL 363 is configured to transition to a first logic level (e.g., logic high value) in response to a request event 129 in the request signal REQ 130 to turn on the power switch S1 112, and the control signal CTRL 363 is configured to transition to a second logic level (e.g., logic low value) in response to the winding signal FWD 138 falling below the output voltage $V_{OUT}$ 118 after the request event 129 in the request signal REQ 130.

Figure 3B:
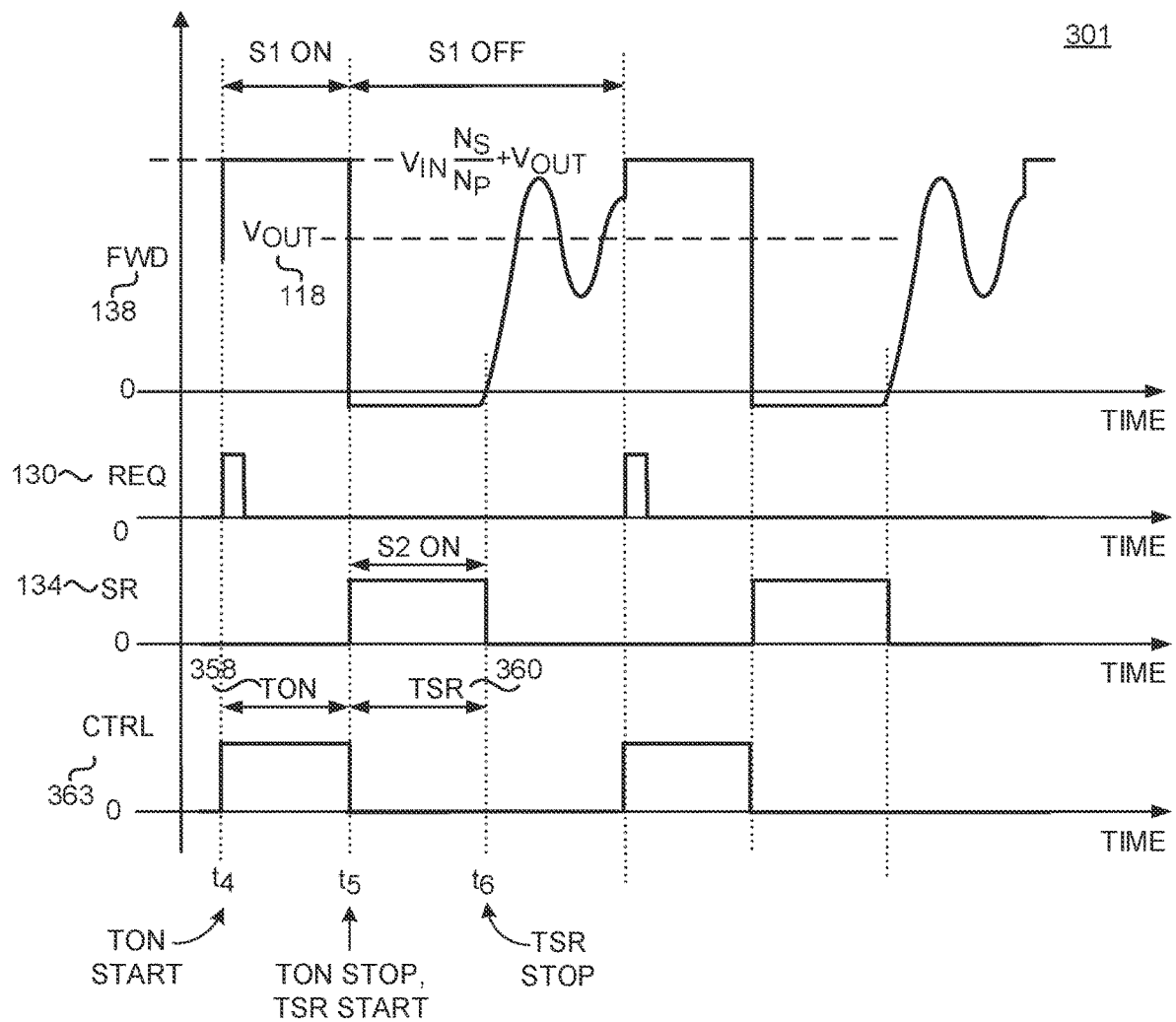
FIG. 3B illustrates waveforms found in a power converter including a controller with an example input voltage estimate circuit with an example timer control in accordance with the teachings of the present invention.

FIG. 3B illustrates another example timing diagram 301 of waveforms found in a switched mode power converter including a controller with an example input voltage estimate circuit with an example timer control 362 in accordance with the teachings of the present invention. As shown in FIG. 3B, at time t4, a request (e.g., pulse) is received in the request signal REQ 130 to turn ON the power switch S1 112. The power switch S1 112 is turned ON and the winding signal FWD 138 is substantially the product of the input voltage $V_{IN}$ 102 and the turns ratio between the output and input winding plus the output voltage $V_{OUT}$ 118, e.g., $$V_{IN} \frac{N_S}{N_P} + V_{OUT}$$

when the power switch S1 112 is conducting. The control signal CTRL 363 transitions to a logic high value and the primary conduction timer 264 begins measuring/timing.

The power switch S1 112 is eventually turned OFF and the winding signal FWD 138 begins to fall and the second drive signal SR 134 controls the turn ON of the output rectifier S2 114. At time t5, the winding signal FWD 138 has fallen below the output voltage $V_{OUT}$ 118, indicating that the power switch S1 112 is no longer conducting. The control signal CTRL 363 transitions to a logic low value and the primary conduction timer 264 stops measuring/timing. The duration between time $t_4$ and time $t_5$ is the primary conduction time $T_{ON}$ 358 measured by the primary conduction timer 264. Further, at time $t_5$, the secondary conduction timer 265 begins measuring/timing. At time $t_6$, the second drive signal SR 134 transitions to a logic low value, indicating that the output rectifier S2 114 is no longer conducting. As such, the secondary conduction timer 265 stops measuring/timing. The duration between time $t_5$ and time $t_6$ is the secondary conduction time $T_{SR}$ 360 measured by the secondary conduction timer 265.

Figure 4:
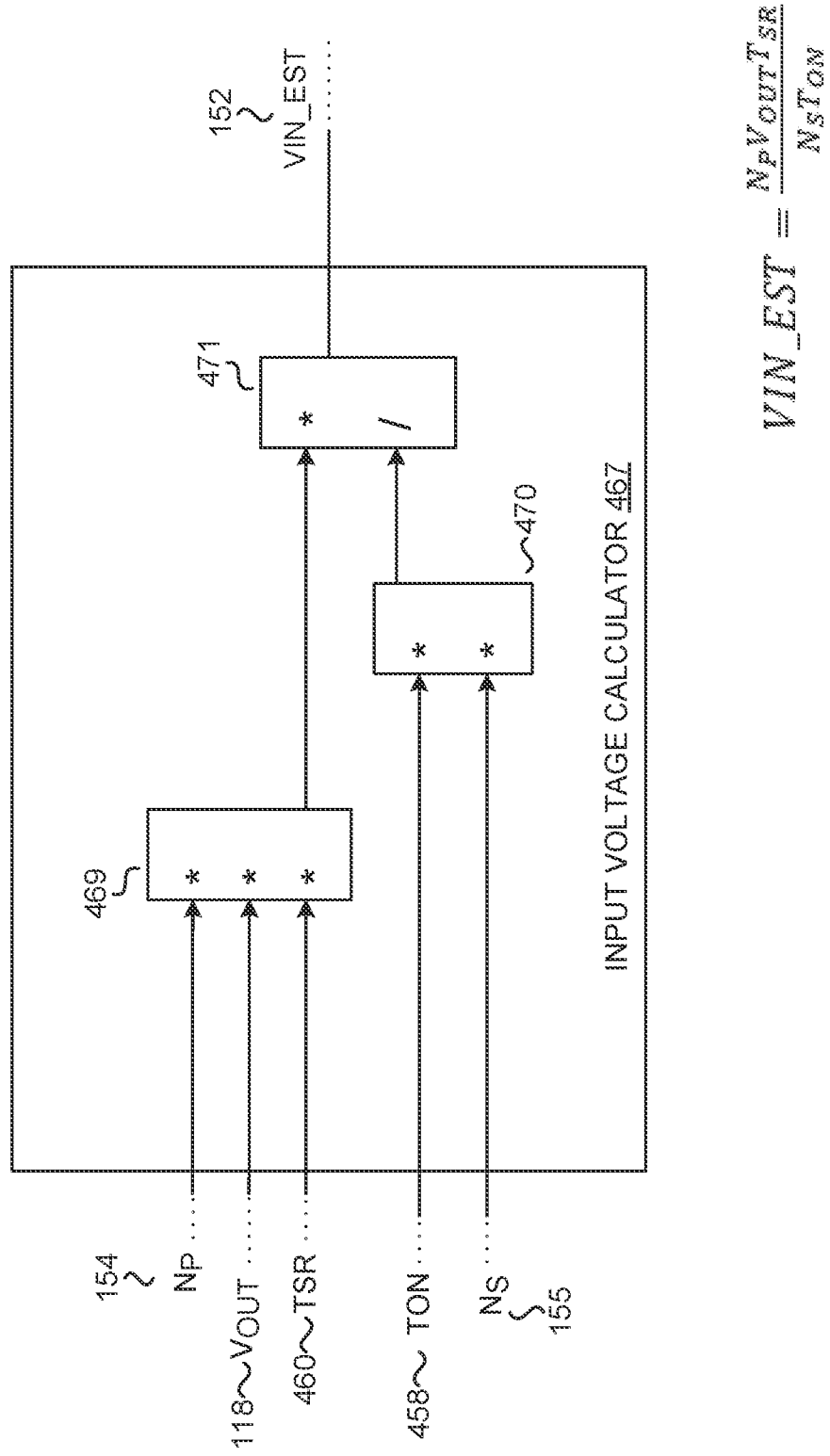
FIG. 4 illustrates a block diagram of an example input voltage calculator included in an example input voltage estimate circuit in accordance with the teachings of the present invention.

FIG. 4 illustrates a block diagram of an example input voltage calculator 467 included in an example input voltage estimate circuit in accordance with the teachings of the present invention. It is appreciated input voltage calculator 467 of FIG. 4 may be an example of input voltage calculator 267 of FIG. 2, and that similarly named and numbered elements described above are coupled and function similarly below.

As shown in the example depicted in FIG. 4, input voltage calculator 467 receives the measured primary conduction time $T_{ON}$ 458, measured secondary conduction time $T_{SR}$ 460, output voltage $V_{OUT}$ 118, number of primary turns $N_P$ 154, and number of secondary turns $N_S$ 155. As shown, input voltage calculator 467 includes arithmetic operators 469, 470, and 471. In response to the measured primary conduction time $T_{ON}$ 458, measured secondary conduction time $T_{SR}$ 460, output voltage $V_{OUT}$ 118, number of primary turns $N_P$ 154, and number of secondary turns $N_S$ 155, the input voltage calculator 467 utilizes volt-second balance and calculates the estimated input voltage VIN_EST 152 per equation (1) above.

Arithmetic operator 469 receives the number of input winding turns $N_P$ 154, the sensed output voltage $V_{OUT}$ 118, and the measured secondary conduction time $T_{SR}$ 460.

Arithmetic operator 469 is a multiplier and the output of arithmetic operator 469 is the product of the number of input winding turns $N_P$ 154, the output voltage $V_{OUT}$ 118, and the measured secondary conduction time $T_{SR}$ 460. In other words, arithmetic operator 469 provides the numerator of equation (1) above.

Arithmetic operator 470 receives the measured primary conduction time $T_{ON}$ 458 and the number of output winding turns $N_S$ 155. Arithmetic operator 470 is a multiplier and the output of arithmetic operator 470 is the product of the measured primary conduction time $T_{ON}$ 458 and the number of output winding turns $N_S$ 155. In other words, arithmetic operator 469 provides the denominator of equation (1) above.

Arithmetic operator 471 is configured to receive the outputs of arithmetic operators 469 and 470. As shown, arithmetic operator 471 is a divider and divides the output of arithmetic operator 469 with the output of arithmetic operator 470. In other words, the output of arithmetic operator 471 is the product of the number of input winding turns $N_P$ 154, the output voltage $V_{OUT}$ 118, and the measured secondary conduction time $T_{SR}$ 460 divided by the product of the measured primary conduction time $T_{ON}$ 458 and the number of output winding turns $N_S$ 155. As such, the input voltage calculator 467 calculates the estimated input voltage VIN_EST 152 per equation (1) above.

It should be appreciated that a power converter can operate in CCM or DCM. The switch utilized for the output rectifier S2 114 is conducting (e.g., transferring energy to the output) during at least a portion of the off-time of the power switch S1 112. During CCM, the current in the output winding 110 of the energy transfer element T1 106 does not reach zero before the power switch S1 112 turns ON again. As such, the output rectifier S2 114 is actively turned OFF to stop conduction prior to the power switch S1 112 turning ON. During DCM, the current in the output winding 110 reaches zero before the power switch S1 112 is turned ON and the output rectifier S2 114 stops conducting before the turning ON of the power switch S1 112.

During discontinuous conduction mode (DCM), the output rectifier S2 114 stops conducting before turning ON the power switch S1 112. As such, ringing occurs on the output winding 110 (which may also be referred to as a relaxation ring) due to the secondary parasitic inductances and capacitances. Each peak of the relaxation ring on the output winding 110 represents a valley point of the power switch S1 112 voltage, and vice versa. The peaks and valleys may be referred to as extremum. As used herein "extremum" or "extrema" includes any local maximum or minimum points or may be referred to as "peaks" and "valleys," where mathematically, the slope (i.e., derivative of the ringing/oscillation waveform) approaches zero. As such, turning on the power switch S1 112 during an extremum of the output winding 110 may minimize switching losses of the power switch S1 112.

Further, it should be appreciated that the first controller 128 and second controller 132 may operate in two modes of operation. A first mode may be quasi-resonant (QR) mode and a second mode may be a zero-voltage (ZV) switching mode. The second controller 132 may receive a mode signal MODE 153 representative of the operational mode of the second controller 132. Elements such as the SR control and request circuit 133 and input voltage estimate circuit 150 may operate in response to the mode signal MODE 153.

For QR mode (e.g., first mode), switching losses may be minimized by turning ON the power switch S1 112 near the peak of the output winding 110 relaxation ring which represents a valley of the power switch S1 112 voltage when the power converter 100 is operating in DCM. Referring back to FIG. 1A, the second controller 132 sends request events 129 in the request signal REQ 130 to the first controller 128 such that the turn ON of the power switch S1 112 would coincide near the peak of the output winding 110 relaxation ring which represents a valley of the power switch S1 112 voltage when the power converter 100 is operating in DCM.

For ZV mode (e.g., second mode), switching losses may be minimized by turning ON another switch in the power converter 100 to discharge the parasitic capacitance associated with the power switch S1 112 prior to the power switch S1 112 turning ON. To facilitate the discharge of the parasitic capacitance of the power switch S1 112, the voltage across the power switch S1 112 should be non-zero when the other switch turns ON. As such, the turning ON of other switch during an extremum of the output winding 110 may minimize switching losses of the power switch S1 112. For ZV mode, switching losses may be minimized by turning ON the other switch near the valley of the output winding relaxation ring which represents a peak of the power switch S1 112 voltage when the power converter 100 is operating in DCM.

One technique to implement ZV switching is to use an active clamp circuit 104 as the other switch to facilitate the discharge of the parasitic capacitance associated with the power switch S1 112. Similar to a passive clamp circuit, an active clamp circuit 104 is coupled across the input winding 108 of the energy transfer element 106 of a power converter 100 and includes a switch (such as a transistor, not shown) to enable current flow through the active clamp circuit 104. The switch for the active clamp circuit 104 may be referred to as a clamp switch. The active clamp circuit 104 facilitates the discharge of the parasitic capacitance associated with the power switch S1 112 and the voltage across the power switch S1 112 falls to substantially zero prior to the power switch S1 112 turning ON and as such switching losses may be reduced. Another technique to implement ZV switching utilizes the output rectifier S2 114 as the other switch to facilitate the discharge of the parasitic capacitance associated with the power switch S1 112.

Referring to FIG. 1A, the first controller 128, the second controller 132, and the power converter 100 can operate in ZV mode (e.g., second mode). In one example of ZV mode, the clamp switch of clamp circuit 104 is turned ON to discharge the parasitic capacitance associated with the power switch S1 112 prior to the power switch S1 112 turning ON. In another example of ZV mode, the output rectifier S2 114 is turned ON to discharge the parasitic capacitance associated with the power switch S1 112 prior to the power switch S1 112 turning ON. Similar to QR mode, during DCM for ZV mode, the second controller 132 monitors the output winding 110 to determine when to turn ON the clamp switch in clamp circuit 104 or when to turn ON the output rectifier S2 112. For the clamp switch in clamp circuit 104 or the output rectifier S2 114 to facilitate the discharge of the parasitic capacitance of the power switch S1 112, the voltage across the power switch S1 112 should be non-zero when the clamp switch or the output rectifier S2 114 turns ON. As such, the turning on of the clamp switch or the output rectifier S2 114 during an extremum of the output winding 110 may minimize switching losses of the power switch S1 112. For ZV mode, switching losses may be minimized by turning ON the clamp switch or output rectifier S2 114 near the valley of the output winding relaxation ring which represents a peak of the power switch S1 112 voltage when the power converter 100 is operating in DCM. Further, there is a delay time between turning OFF the clamp switch or the output rectifier S2 114 and turning ON the power switch S1 112 to allow the voltage across the power switch S1 112 to fall to zero.

In operation of ZV mode utilizing the clamp switch of active clamp circuit 104, the second controller 132 sends request events 129 in the request signal REQ 130 to the first controller 128 to request the turn ON of the power switch S1 112 and the turn ON of the clamp switch of the clamp circuit 104. The second controller 132 sends request events 129 in the request signal REQ 130 such that the clamp drive signal CD 148 controls the turn ON of the clamp switch in clamp circuit 104 near the valley of the output winding 110 relaxation ring which represents a peak of the power switch S1 112 voltage when the power converter 100 is operating in DCM. The clamp drive signal CD 148 then controls the turn OFF of the clamp switch in clamp circuit 104. A delay time occurs between the turn OFF of the clamp switch in clamp circuit 104 and the subsequent turn ON of the power switch S1 112. The delay time allows the voltage across the power switch S1 112 to fall to zero.

For QR mode (e.g., first mode), the input voltage estimate circuit 150 operates similarly to what is discussed with respect to FIGS. 2, 3A/3B, and 4. However, in ZV mode (e.g., second mode), the delay time between turning OFF the clamp switch in clamp circuit 104 and turning ON the power switch S1 112 or the delay time between turning OFF the output rectifier S2 114 and turning ON the power switch S1 112 should be considered when estimating the input voltage $V_{IN}$ 102.

As shown with respect to FIGS. 1A and 2, the second controller 132 and input voltage estimate circuit 150 can receive a mode signal MODE 153 representative of an operational mode of the second controller 132. For example, the second controller 132 may operate in a first mode or a second mode. The first mode may be the quasi-resonant (QR) mode and the second mode may be the zero-voltage (ZV) switching mode. Further, the timer 282 of the input voltage estimate circuit 250/150 receives the mode signal MODE 153. In one example, the mode signal MODE 153 is a rectangular pulse waveform with varying lengths of logic high and logic low sections. A logic high value for the mode signal MODE 153 may represent the first mode of operation while a logic low value for the mode signal MODE 153 may represent the second mode of operation.

Figure 5A:
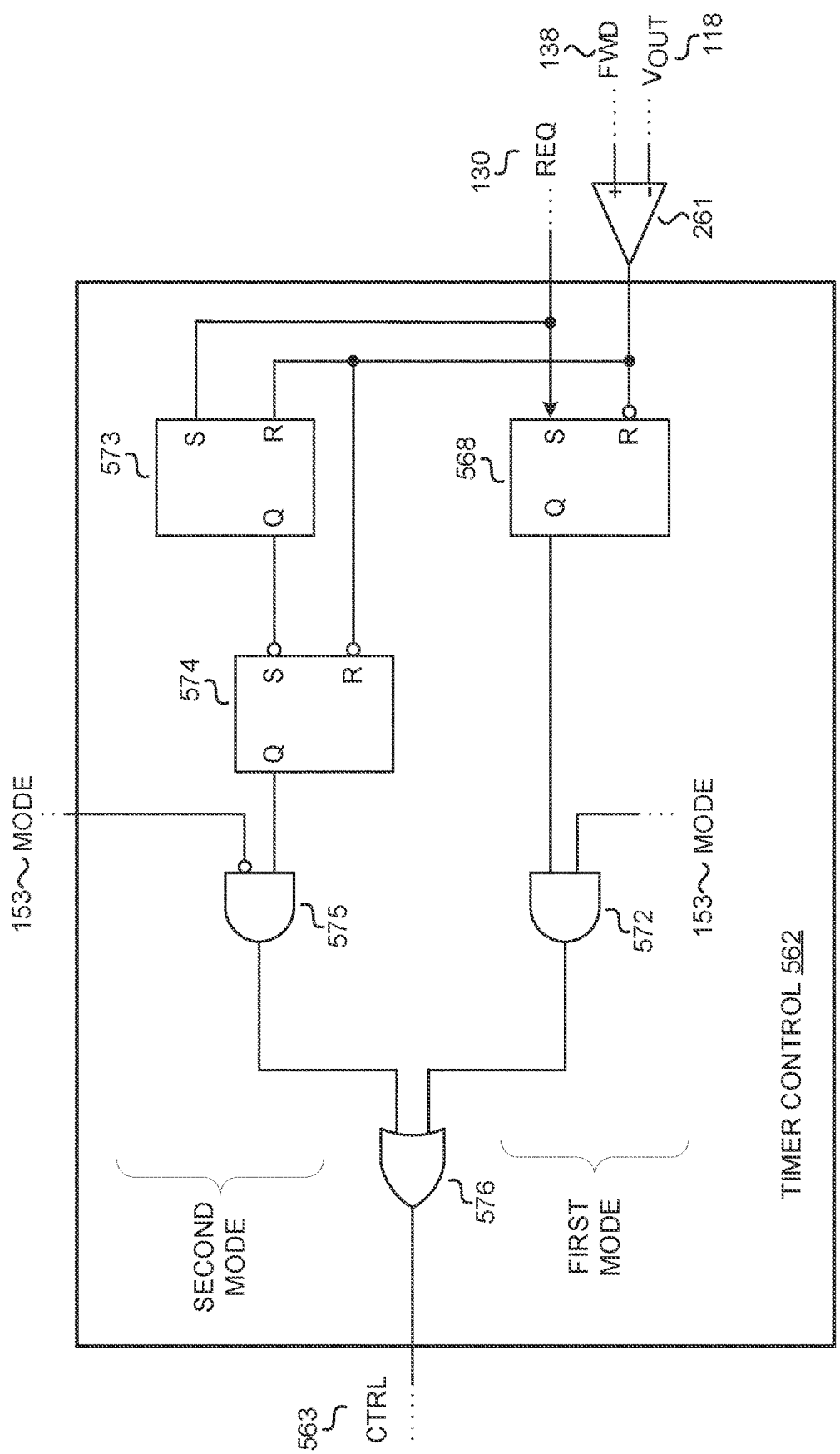
FIG. 5A illustrates a block diagram of another example timer control included in an example input voltage estimate circuit in accordance with the teachings of the present invention.

FIG. 5A illustrates a block diagram of another example of a timer control 562 included in an example input voltage estimate circuit in accordance with the teachings of the present invention. In particular, FIG. 5A illustrates one example of the timer control 562 if the second controller 132 can operate in a first mode or in a second mode. It is appreciated that the example timer control 562 depicted in FIG. 5A is one example of the timer control 262 shown in FIG. 2, and that similarly named and numbered elements described above are coupled and function similarly below.

As shown, the timer control 562 is configured to receive the request signal REQ 130, mode signal MODE 153, and the output of comparator 261. Comparator 261 receives the winding signal FWD 138 at its non-inverting input and the output voltage $V_{OUT}$ 118 at its inverting input. Timer control 562 outputs the control signal CTRL 563, which is one example of control signal CTRL 263 shown in FIG. 2. In one embodiment, the control signal CTRL 563 is a rectangular pulse waveform with varying lengths of logic high and logic low sections. The control signal CTRL 563 is utilized in part to control the primary conduction timer 264 and the secondary conduction timer 265. In particular, the control signal CTRL 563 is utilized to start and stop the primary conduction timer 264. The control signal CTRL 563 is also utilized to start the secondary conduction timer 265.

Timer control 562 is illustrated as including latch 568, AND gate 572, latch 573, latch 574, AND gate 575, and OR gate 576. Latch 568 and AND gate 572 are utilized for the first mode (e.g., QR mode) while latches 573, 574, and AND gate 575 are utilized for the second mode (e.g., ZV mode of operation). As shown, AND gate 572 and AND 575 are utilized to determine whether the output of latch 568 or latch 574 is passed on to the OR gate 576 in response to the mode signal MODE 153. In one example, the mode signal MODE 153 is a rectangular pulse waveform with varying lengths of logic high and logic low sections. A logic high value for the mode signal MODE 153 may represent the first mode (e.g., QR mode) of operation while a logic low value for the mode signal MODE 153 may represent the second mode (e.g., ZV mode) of operation.

Latch 568 receives the request signal REQ 130 at its set-input and the output of comparator 261 at its reset-input, however the small circle indicates that latch 568 receives the inverted output of comparator 261 at its reset-input. In operation, the latch 568 is set in response to a request event (e.g., pulse) in the request signal REQ 130 and resets when the winding signal FWD 138 falls below the output voltage $V_{OUT}$ 118.

AND gate 572 is coupled to receive the output of latch 568 and the mode signal MODE 153. The output of AND gate 572 is coupled to the input of OR gate 576.

Latch 573 is coupled to receive the request signal REQ 130 at its set-input and the output of comparator 261 at its reset-input. In operation, latch 573 is set in response to a request event (e.g., pulse) in the request signal REQ 130 and reset when the winding signal FWD 138 increases above the output voltage $V_{OUT}$ 118.

Latch 574 is coupled to receive the output of comparator 261 at its reset-input, however the small circle indicates that latch 574 receives the inverted output of comparator 261 at its reset-input. Similarly, latch 574 is coupled to receive the output of latch 573 at its set-input, however the small circle indicates that latch 574 receives the inverted output of latch 573. In operation, latch 574 sets in response to trailing edges in the output of latch 574 and resets when the winding signal FWD 138 falls below the output voltage $V_{OUT}$ 118. In other words, latch 574 is set when latch 573 is reset, e.g., when the winding signal FWD 138 increases above the output voltage $V_{OUT}$ 118 after a request event in the request signal REQ 130. Latch 574 is reset when the winding signal FWD 138 falls below the output voltage $V_{OUT}$ 118.

AND gate 575 is coupled to receive the output of latch 574 and the mode signal MODE 153. However, the small circle indicates that the AND gate 575 receives the inverted mode signal MODE 153. The output of AND gate 575 is coupled to the input of OR gate 576. As shown, the output of OR gate 576 is the control signal CTRL 563.

In one example of operation, a logic high value for the mode signal MODE 153 may represent the first mode (e.g., QR mode) of operation while a logic low value for the mode signal MODE 153 may represent the second mode (e.g., ZV mode) of operation.

When the mode signal MODE 153 is logic high, indicating the first mode (e.g., QR mode) of operation, one of the inputs to AND gate 575 is logic low. As such, the output of AND gate 575 is logic low and the output of latch 574 is not passed onto the OR gate 576. In other words, when the mode signal MODE 153 is logic high indicating the first mode (e.g., QR mode), the control signal CTRL 563 does not respond to the output of latch 574.

Rather, control signal CTRL 563 responds to the output of latch 568. If the mode signal MODE 153 is logic high, one of the inputs to AND gate 572 is logic high. As such, the output of AND gate 572 is responsive to the output of latch 568. The output of latch 568 is passed through AND gate 572 and OR gate 576. In other words, when the mode signal MODE 153 is logic high indicating the first mode (e.g., QR mode), the control signal CTRL 563 is responsive to the output of latch 568.

In operation for the first mode (e.g., QR mode), the control signal CTRL 563 transitions to a logic high value in response to the request signal REQ 130. In particular, the control signal CTRL 563 transitions to a logic high value in response to the request signal REQ 130 indicating the power switch S1 112 should turn ON. A request event 129 (e.g., pulse) is utilized by the request signal REQ 130 to indicate a request to turn ON the power switch S1 112. The control signal CTRL 563 transitions to a logic low value when the winding signal FWD 138 falls below the output voltage $V_{OUT}$ 118. Therefore, in the depicted example, when the power converter is operating in the first mode (e.g., the mode signal MODE 153 is logic high), the timer control circuit 562 is configured to generate the control signal CTRL 563 to transition to the first logic level (e.g., a logic high value) in response to the request event 129 in the request signal REQ 130 to turn on the power switch S1 112, and the timer control circuit 562 configured to generate the control signal CTRL 563 to transition to the second logic level (e.g., a logic low value) in response to the winding signal FWD 138 falling below the output voltage $V_{OUT}$ 118 after the request event 129 in the request signal REQ 130.

When the mode signal MODE 153 is logic low, indicating the second mode (e.g., ZV mode) of operation, one of the inputs to AND gate 572 is logic low. As such, the output of AND gate 572 is logic low and the output of latch 568 is not passed onto the input OR gate 576. In other words, when the mode signal MODE 153 is logic low, indicating the second mode (e.g., ZV mode), the control signal CTRL 563 does not respond to the output of latch 568.

Rather, control signal CTRL 563 responds to the output of latch 574. If the mode signal MODE 153 is logic low, one of the inputs to AND gate 575 is logic high. As such, the output of AND gate 575 is responsive to the output of latch 574. The output of latch 574 is passed through AND gate 575 and OR gate 576. In other words, when the mode signal MODE 153 is logic low indicating the second mode (e.g., ZV mode), the control signal CTRL 563 is responsive to the output of latch 574. Therefore, in the depicted example, when the power converter is operating in the second mode (e.g., the mode signal MODE 153 is logic low), the timer control circuit 562 is configured to generate the control signal CTRL 563 to transition to the first logic level (e.g., a logic high value) in response to the winding signal FWD 138 increasing above the output voltage $V_{OUT}$ 118 after the request event 129 in the request signal REQ 130, and the timer control circuit 562 configured to generate the control signal CTRL 563 to transition to the second logic level (e.g., a logic low value) in response to the winding signal FWD 138 falling below the output voltage $V_{OUT}$ 118 after the request event 129 in the request signal REQ 130.

Figure 5B:
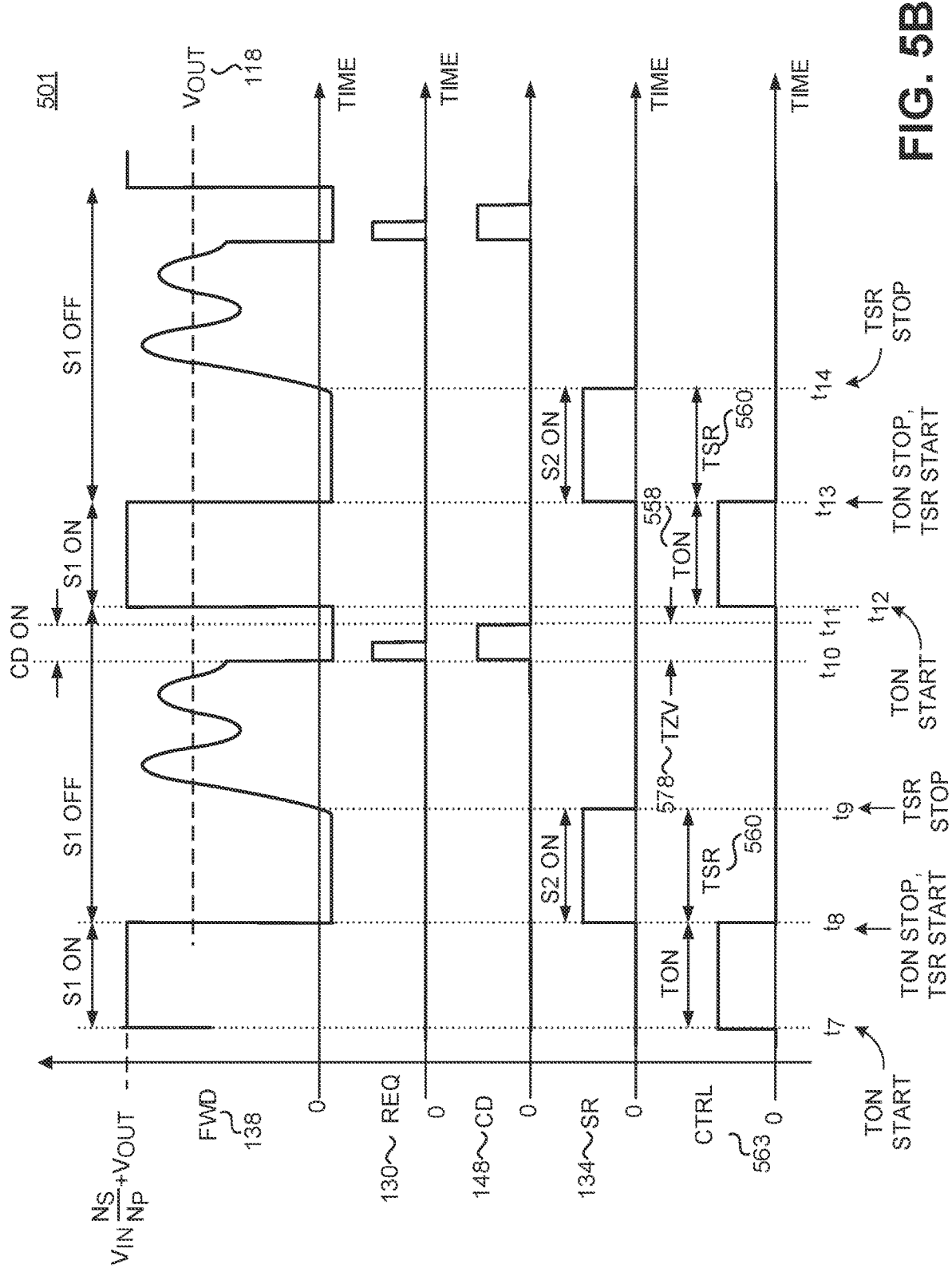
FIG. 5B illustrates waveforms found in a power converter including a controller with an example input voltage estimate circuit with another example timer control in accordance with the teachings of the present invention.

FIG. 5B illustrates another example timing diagram 501 of waveforms found in a switched mode power converter including a controller with an example input voltage estimate circuit with example timer control 562 in accordance with the teachings of the present invention. In particular, FIG. 5B illustrates a timing diagram 501 with example waveforms of the winding signal FWD 138, request signal REQ 130, clamp drive signal CD 148, second drive signal SR 134, and control signal CTRL 563 of timer control 562 shown in FIG. 5A while the power converter 100 is operating in discontinuous conduction mode (DCM) and the second controller 132 is operating in the second mode (e.g., ZV mode). Further, the power converter 100 is utilizing a clamp switch and an active clamp circuit to facilitate ZV switching. However, it should be appreciated that the output rectifier S2 114 may be used to facilitate ZV switching.

At time $t_7$, the power switch S1 112 is turned ON and the winding signal FWD 138 is substantially the product of the input voltage $V_{IN}$ 102 and the turns ratio between the output and input winding plus the output voltage $V_{OUT}$ 118, e.g., $$V_{IN}\frac{N_S}{N_P} + V_{OUT}$$

when the power switch S1 112 is conducting. The control signal CTRL 563 transitions to a logic high value and the primary conduction timer 264 begins measuring/timing. The power switch S1 112 is turned OFF and the winding signal FWD 138 begins to fall and the second drive signal SR 134 controls the turn ON of the output rectifier S2 114. At time $t_5$, the winding signal FWD 138 has fallen below the output voltage $V_{OUT}$ 118, indicating that the power switch S1 112 is no longer conducting. Latch 574 is reset and the control signal CTRL 563 transitions to a logic low and the primary conduction timer 264 stops measuring/timing. The duration between time $t_7$ and time $t_5$ is the primary conduction time $T_{ON}$ 558 measured by the primary conduction timer 264. Further, at time $t_5$, the secondary conduction timer 265 begins measuring/timing. At time $t_9$, the second drive signal SR 134 transitions to a logic low value, indicating that the output rectifier S2 114 is no longer conducting. As such, the secondary conduction timer 265 stops measuring/timing. The duration between time $t_5$ and time $t_9$ is the secondary conduction time $T_{SR}$ 560 measured by the secondary conduction timer 265.

At time $t_{10}$, a request event is received in the request signal REQ 130 and the clamp drive signal CD 148 transitions to a logic high value to turn ON the clamp switch of the clamp circuit 104. As shown, the clamp drive signal CD 148 transitions to logic high near a valley in the relaxation ring of the winding signal FWD 138. At time $t_{11}$, the clamp drive signal CD 148 controls the turn OFF of the clamp switch in clamp circuit 104. The duration between time $t_{10}$ and time $t_{11}$ is referred to as the zero voltage set up time $T_{ZV}$ 578. In one embodiment, the zero voltage set up time $T_{ZV}$ 578 may be a fixed value which can be trimmed/provided to the first controller 128 and second controller 132. The zero voltage set up time 578 may be representative of the time to charge or discharge circuitry to facilitate ZVS. For example, the zero voltage set up time 578 may be representative of the time to charge the energy transfer element T1 106 to facilitate ZVS. However, it should be appreciated that if the output rectifier S2 114 is utilized for ZVS, the output rectifier S2 114 would turn ON between times $t_{10}$ and time $t_{11}$ and the second drive signal SR 134 would be logic high between times $t_{10}$ and time $t_{11}$. The conduction of the output rectifier S2 114 during this would also be referred to as zero voltage set up time $T_{ZV}$ 578.

After a delay time, the power switch S1 112 is turned ON at time $t_{12}$. As shown, the delay time is the duration between time $t_{11}$ and time $t_{12}$. The duration of the delay time may be selected such that the voltage across the power switch S1 112 falls to zero. During the zero voltage set up time $T_{ZV}$ 578 and the delay time, the value of the winding signal FWD 138 is well below the output voltage $V_{OUT}$ 118.

At time $t_{12}$, the power switch S1 112 is turned ON and the winding signal FWD 138 increases above the output voltage $V_{OUT}$ 118 and the winding signal FWD 138 is substantially the product of the input voltage $V_{IN}$ 102 and the turns ratio between the output and input winding plus the output voltage $V_{OUT}$ 118, e.g., $$V_{IN}\frac{N_S}{N_P} + V_{OUT},$$

when the power switch S1 112 is conducting.

Referring back to FIG. 5A, the latch 574 is not set until the winding signal FWD 138 has risen above the output voltage $V_{OUT}$ 118 after a request event in the request signal REQ 130. At time $t_{12}$, the control signal CTRL 563 transitions to a logic high value and the primary conduction timer 264 begins measuring/timing.

The power switch S1 112 is eventually turned OFF and the winding signal FWD 138 begins to fall and the second drive signal SR 134 controls the turn ON of the output rectifier S2 114. At time $t_{13}$, the winding signal FWD 138 has fallen below the output voltage $V_{OUT}$ 118, indicating that the power switch S1 112 is no longer conducting. Latch 574 is reset and the control signal CTRL 563 transitions to a logic low value and the primary conduction timer 264 stops measuring/timing. The duration between time $t_{12}$ and time $t_{13}$ is the primary conduction time $T_{ON}$ 558 measured by the primary conduction timer 264. Further, at time $t_{13}$, the secondary conduction timer 265 begins measuring/timing. At time $t_{14}$, the second drive signal SR 134 transitions to a logic low value, indicating that the secondary switch S2 is no longer conducting. As such, the secondary conduction timer 265 stops measuring/timing. The duration between time $t_{13}$ and time $t_{14}$ is the secondary conduction time $T_{SR}$ 560 measured by the secondary conduction timer 265.

As shown in FIG. 5B, the winding signal FWD 138 is well below the output voltage $V_{OUT}$ 118 twice during the off time of the power switch S1 112 due the conduction of the output rectifier S2 114 and the conduction of the clamp switch in clamp circuit 104 when the second controller 132 and first controller 128 are operating in the second mode (e.g., ZV mode). As such, the duration of the zero voltage set up (e.g., $T_{ZV}$) should be considered for the volt-second balance of the energy transfer element T1 106. Thus, when the second controller 132 and first controller 128 are operating in the second mode (e.g., ZV mode), per volt-second balance, the estimate (e.g., $V_{IN}$ EST) of input voltage $V_{IN}$ 102 is substantially the product of the number of primary turns $N_P$ 154, output voltage $V_{OUT}$ 118, and the sum of the secondary conduction time $T_{SR}$ 560 and zero voltage set up time $T_{ZV}$ 578 divided by the product of the number of secondary turns $N_S$ 155 and the primary conduction time $T_{ON}$ 558, or mathematically:

$$\text{VIN\_EST} = \frac{N_P V_{OUT}(T_{SR} + T_{ZV})}{N_S T_{ON}} \quad (2)$$

However, it should be appreciated that if the first controller 128 and second controller 132 are operating in the first mode (e.g., QR mode), the estimated input voltage VIN_EST 152 is substantially equal to equation (1) above.

Figure 6:
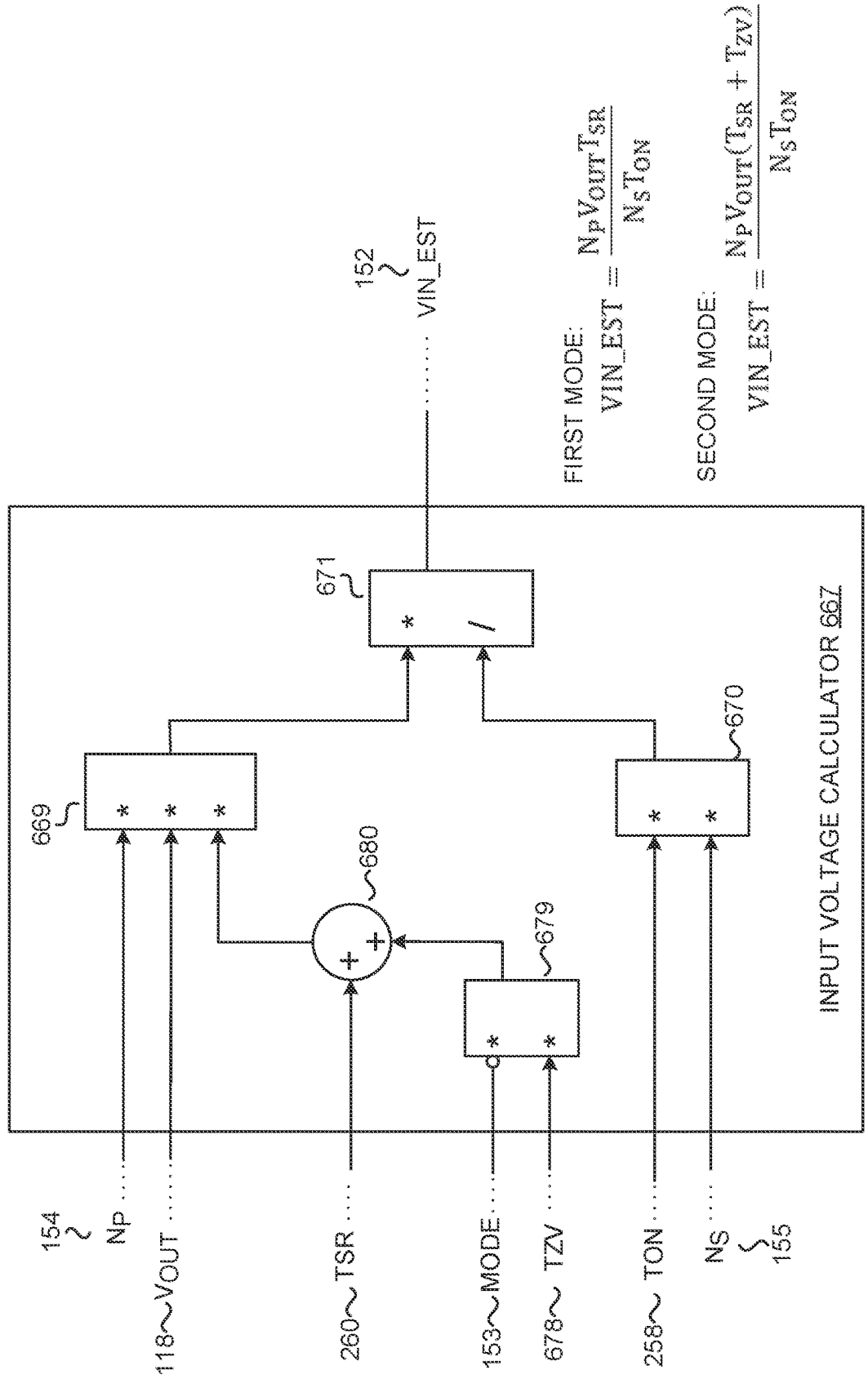
FIG. 6 illustrates a block diagram of another example input voltage calculator included in an example input voltage estimate circuit in accordance with the teachings of the present invention.

FIG. 6 illustrates a block diagram of another example input voltage calculator 667 included in an example input voltage estimate circuit in accordance with the teachings of the present invention. It is appreciated that the example input voltage calculator 667 depicted in FIG. 6 is one example of the input voltage calculator 267 shown in FIG. 2, and that similarly named and numbered elements described above are coupled and function similarly below. Further, input voltage calculator 667 may be used in conjunction with timer control 562 discussed with respect to FIGS. 5A and 5B.

As shown in the example depicted in FIG. 6, input voltage calculator 667 receives the measured primary conduction time $T_{ON}$ 258, measured secondary conduction time $T_{SR}$ 260, output voltage $V_{OUT}$ 118, number of primary turns $N_P$ 154, number of secondary turns $N_S$ 155, the mode signal MODE 153, and the zero voltage set up time $T_{ZV}$ 678. As shown, input voltage calculator 667 includes arithmetic operators 669, 670, 671, 679, and 680. In response to the measured primary conduction time $T_{ON}$ 258, measured secondary conduction time $T_{SR}$ 260, output voltage $V_{OUT}$ 118, number of primary turns $N_P$ 154, number of secondary turns $N_S$ 155, the mode signal MODE 153, and the zero voltage set up time $T_{ZV}$ 678, the input voltage calculator 667 utilizes volt-second balance and calculates the estimated input voltage VIN_EST 152 per equation (1) or equation (2) above.

If the mode signal MODE 153 indicates that the second controller 132 is operating in the first mode (e.g., QR mode), the input voltage calculator 667 determines the estimated input voltage VIN_EST 152 per equation (1). If the mode signal MODE 153 indicates that the second controller 132 is operating in the second mode (e.g., ZV mode), the input voltage calculator 667 determines the estimated input voltage VIN_EST 152 per equation (2).

As shown in the depicted example, arithmetic operator 670 receives the measured primary conduction time $T_{ON}$ 258 and the number of output winding turns $N_S$ 155. Arithmetic operator 670 is a multiplier and the output of arithmetic operator 670 is the product of the measured primary conduction time $T_{ON}$ 258 and the number of output winding turns $N_S$ 155. In other words, the arithmetic operator 670 provides the denominator of equation (1) or equation (2).

Arithmetic operator 679 receives the zero voltage set up time $T_{ZV}$ 678 and the mode signal MODE 153. The small circle at the input of arithmetic operator 679 indicates that the arithmetic operator 679 receives the inverted mode signal MODE 153. Arithmetic operator 679 is a multiplier and multiplies the zero voltage set up time $T_{ZV}$ 678 with the value of mode signal MODE 153. The output of arithmetic operator 679 is received by arithmetic operator 680.

Arithmetic operator 680 is coupled to receive the measured secondary conduction $T_{SR}$ 260 and the output of arithmetic operator 679. As shown, arithmetic operator 680 is an adder, and adds the receive the measured secondary conduction $T_{SR}$ 260 with the output of arithmetic operator 679. The output of arithmetic operator 679 is received by arithmetic operator 680.

Arithmetic operator 669 receives the number of input winding turns $N_P$ 154, the sensed output voltage $V_{OUT}$ 118, and the output of arithmetic operator 680. Arithmetic operator 669 is a multiplier and the output of arithmetic operator 669 is the product of the number of input winding turns $N_P$ 154, the output voltage $V_{OUT}$ 118, and the output of arithmetic operator 680. The output of arithmetic operator 669 provides the numerator of either equation (1) or equation (2).

As mentioned above, the mode signal MODE 153 is a rectangular pulse waveform with varying lengths of logic high and logic low sections. A logic high value for the mode signal MODE 153 may represent the first mode (e.g., QR mode) of operation while a logic low value for the mode signal MODE 153 may represent the second mode (e.g., ZV mode) of operation.

For the first mode (e.g., QR mode), the output of arithmetic operator 679 is substantially logic low, or zero. Arithmetic operator 679 receives the inverted mode signal MODE 153, which would be logic low for the first mode (e.g., QR mode). In one example, logic low is substantially zero and the zero voltage set up time $T_{ZV}$ 678 is multiplied to logic low or zero. As such, the output of arithmetic operator 679 is substantially logic low, or zero. The output of arithmetic operator 680 is substantially the measured secondary conduction $T_{SR}$ 260. As such, the arithmetic operator 669 outputs the product of the number of input winding turns $N_P$ 154, the output voltage $V_{OUT}$ 118, and the measured secondary conduction $T_{SR}$ 260 to provide the numerator of equation (1).

For the second mode (e.g., ZV mode), the output of arithmetic operator 679 is substantially the zero voltage set up time $T_{ZV}$ 678. In particular, arithmetic operator 679 receives the inverted mode signal MODE 153, which would be logic high for the second mode (e.g., ZV mode). In one example, logic high is substantially one and the zero voltage set up time $T_{ZV}$ 678 is therefore multiplied to logic high or one by arithmetic operator 679. As such, the output of arithmetic operator 679 is substantially the zero voltage set up time $T_{ZV}$ 678. The output of arithmetic operator 680 is substantially the sum of the measured secondary conduction $T_{SR}$ 260 and the zero voltage set up time $T_{ZV}$ 678 received from arithmetic operator 679. As such, the arithmetic operator 669 outputs the product of the number of input winding turns $N_P$ 154, the output voltage $V_{OUT}$ 118, and the sum of the measured secondary conduction $T_{SR}$ 260 and the zero voltage set up time $T_{ZV}$ 678 to provide the numerator of equation (2).

Arithmetic operator 671 is configured to receive the output of arithmetic operators 669 and 670. As shown, arithmetic operator 671 is a divider and divides the output of arithmetic operator 669 with the output of arithmetic operator 670. If the mode signal MODE 153 indicates the first mode (e.g., QR mode), the output of arithmetic operator 671 is the product of the number of input winding turns $N_P$ 154, the output voltage $V_{OUT}$ 118, and the measured secondary conduction time $T_{SR}$ 260 divided by the product of the measured primary conduction time $T_{ON}$ 258 and the number of output winding turns $N_S$ 155 per the estimated input voltage VIN_EST 152 per equation (1) above. If the mode signal MODE 153 indicates the second mode (e.g., ZV mode), the output of arithmetic operator 671 is the product of the number of input winding turns $N_P$ 154, the output voltage $V_{OUT}$ 118, and the sum of the measured secondary conduction $T_{SR}$ 260 and the zero voltage set up time $T_{ZV}$ 678 divided by the product of the measured primary conduction time $T_{ON}$ 258 and the number of output winding turns $N_S$ 155 per the estimated input voltage VIN_EST 152 per equation (2) above.

Figure 7:
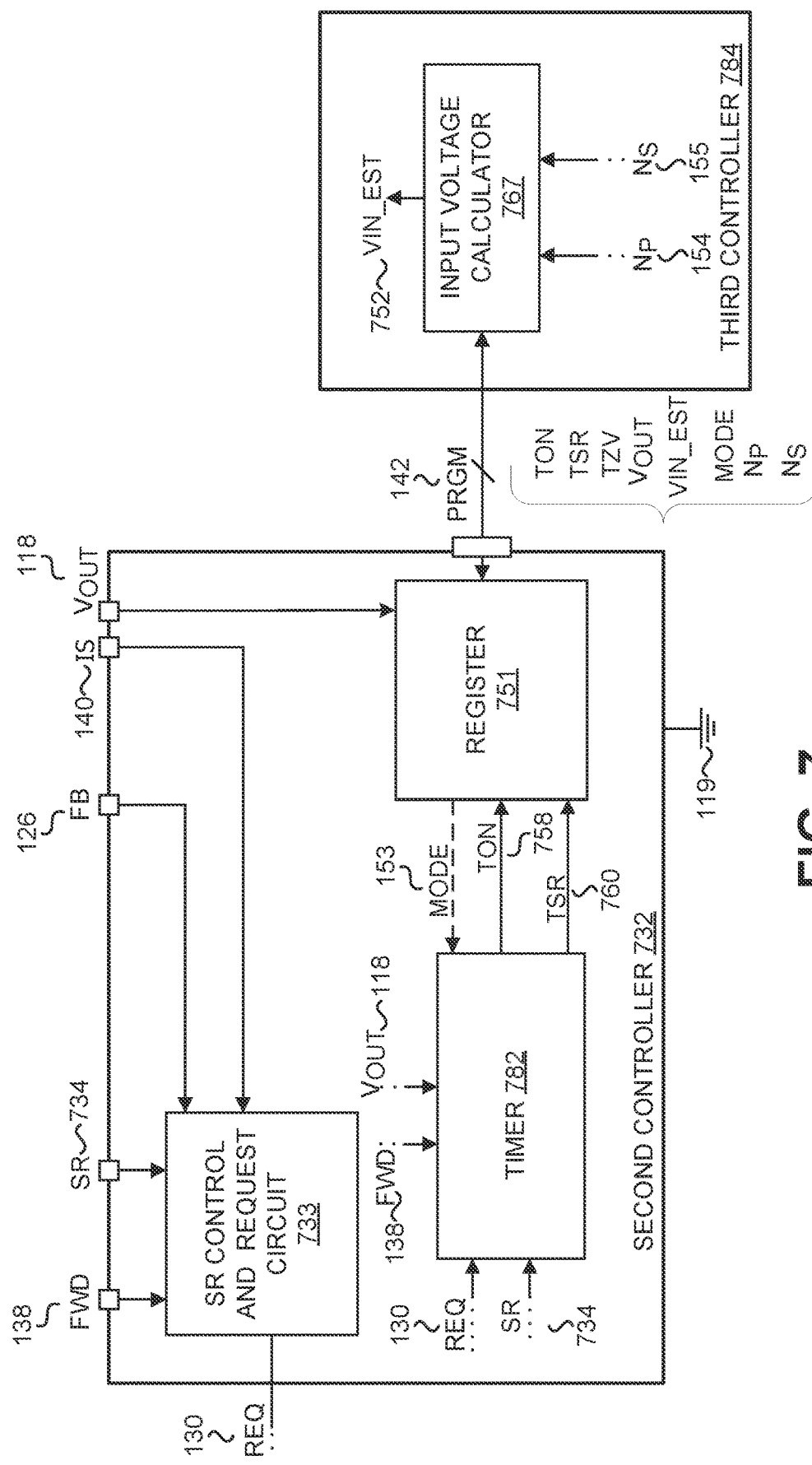
FIG. 7 illustrates a block diagram of an example of a second controller coupled to a third controller including an example input voltage calculator in accordance with the teachings of the present invention.

FIG. 7 illustrates a block diagram of an example of a second controller 732 coupled to a third controller 784 including an example input voltage calculator in accordance with the teachings of the present invention. It is appreciated that FIG. 7 illustrates another example of input voltage estimate circuit 150 of FIG. 1, and as such, similarly named and numbered elements described above are coupled and function similarly below. It is further appreciated that in the example depicted in FIG. 7, the timer 782 is within the second controller 732 and the input voltage calculator 767 is within a third controller 784. The timer 782 is one example of timer 282 discussed with respect to FIG. 2, and may include a timer control as discussed with respect to FIGS. 3A and 5A. Further, input voltage calculator 767 may be one example of input voltage calculator 267, 467, 667 discussed with respect to FIGS. 2, 4 and 6.

As shown in the example depicted in FIG. 7, timer 782 is configured to receive the request signal REQ 130, the second drive signal SR 734, the winding signal FWD 138 and the output voltage $V_{OUT}$ 118. It should be appreciated that comparator 261 shown in FIG. 2 may also be included with timer 782. The timer 782 determines the measured primary conduction time $T_{ON}$ 758 and secondary conduction time $T_{SR}$ 760 per the embodiments discussed previously. The timer 782 outputs the measured primary conduction time $T_{ON}$ 758 and secondary conduction time $T_{SR}$ 760 to the register 751. Although a timer 782 is discussed, a counter may also be. A counter would receive a clock signal and counts the number of clock events between the start and stop of the respective primary conduction timer or secondary conduction timer. Further, the primary conduction timer or the secondary conduction timer may be implemented with a running average timer.

Register 751 stores information which can sent to or received from the third controller 784 via the program terminal PRGM 142. As mentioned above, a program signal may be sent to or received through the program terminal PRGM 142 to communicate information between the second controller 732 and the third controller 784. For example, the second controller 732 may receive information regarding the number of turns $N_P$ 154 of the input winding 108 and the number of turns $N_S$ 155 of the output winding 110 from third controller 784. The second controller 732 may also receive a mode signal MODE 153 representative of the second controller 732 operating in a first mode or a second mode from register 751. The second controller 732 may also provide information, such as the measured primary conduction $T_{ON}$ 758 and the measured secondary conduction $T_{SR}$ 760 to the third controller 784. In one embodiment, the third controller 784 may be a microcontroller. Further, the communication between the second controller 732 and the third controller 784 may be performed via an inter-integrated (I2C) bus and utilize the I2C protocol. In another embodiment, communication may be performed utilizing the Universal Asynchronous Receiver/Transmitter (UART) protocol. In a further embodiment, communication between the second controller 732 and the third controller 784 may be optical, inductive, or capacitive.

Third controller 784 is shown as including the input voltage calculator 767. As shown, the measured primary conduction time $T_{ON}$ 758 and secondary conduction time $T_{SR}$ 760 are sent to the third controller 784 from the second controller 732 via the program terminal PRGM 14. The input voltage calculator 767 further receives the number of turns $N_P$ 154 of the input winding 108 and the number of turns $N_S$ 155 of the output winding 110. The output of the input voltage calculator 767 is the estimated input voltage VIN_EST 752. In various examples, the estimated input voltage VIN_EST 752 of the power converter may then be stored and/or utilized to vary the output power of the power converter. It should be appreciated that the input calculator discussed with respects to FIG. 2, 4, or 6 may be utilized for input voltage calculator 767.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1. A controller for use in a power converter, comprising: a synchronous rectifier (SR) control and request circuit coupled to be responsive to a winding signal representative of an output winding voltage of an energy transfer element of the power converter, wherein the SR control and request circuit is configured to generate a second drive signal in response to the winding signal, and a request signal in response to a feedback signal representative of an output of the power converter, wherein a power switch coupled to an input winding of the energy transfer element is configured to be turned on in response to the request signal and wherein an output rectifier coupled to the output winding is configured to be controlled in response to the second drive signal; and an input voltage estimate circuit coupled to the SR control and request circuit to receive the second drive signal and the request signal, wherein the input voltage estimate circuit is further coupled to receive the winding signal and an output voltage signal representative of an output voltage of the power converter, and wherein the input voltage estimate circuit is configured to generate an input voltage estimate of an input voltage of the power converter in response to a signal representative of a number of primary turns of the energy transfer element, a signal representative of a number of secondary turns of the energy transfer element, the output voltage signal, a primary conduction time signal representative of the power switch conduction and a secondary conduction time signal representative of the output rectifier conduction, and wherein the input voltage estimate circuit determines the primary conduction time signal and the secondary conduction time signal in response to the winding signal, the second drive signal, the output voltage signal, and the request signal.

Example 2. The controller of example 1, wherein the input voltage estimate circuit comprises a timer, the timer comprising a timer control circuit configured to generate a control signal in response to the request signal, the winding signal, and the output voltage signal, wherein the control signal is coupled to transition to a first logic level in response to a request event in the request signal to turn on the power switch, and wherein the control signal is coupled to transition to a second logic level in response to the winding signal falling below the output voltage signal after the request event; a primary conduction timer configured to generate the primary conduction time signal in response to the first logic level and the second logic level in the control signal; and a secondary conduction timer configured to generate the secondary conduction time signal in response to the second logic level in the control signal and a second logic level in the second drive signal.

Example 3. The controller of example 1 or 2, wherein the controller further includes a comparator coupled to compare the winding signal and the output voltage signal, wherein the timer control circuit is coupled to an output of the comparator Example 4. The controller of any one of examples 1 to 3, wherein the timer control circuit includes a first latch coupled to be set in response to the request signal and reset in response to the winding signal falling below the output voltage signal, and wherein the control signal is coupled to be responsive to an output of the first latch Example 5. The controller of any one of examples 1 to 4, wherein the input voltage estimate circuit further comprises an input voltage calculator configured to generate the input voltage estimate in response to the primary conduction time signal, the secondary conduction time signal, the output voltage signal, the number of primary turns of the energy transfer element, and the number of secondary turns of the energy transfer element.

Example 6. The controller of any one of examples 1 to 5, wherein the input voltage calculator comprises a first arithmetic operator having a first input coupled to receive a numerator signal, a second input coupled to receive a denominator signal, and an output configured to generate the input voltage estimate in response to a quotient of the first input of the first arithmetic operator and the second input of the first arithmetic operator; a second arithmetic operator having a first input coupled to receive the primary conduction time signal, a second input coupled to receive the signal representative of the number of secondary turns of the energy transfer element, and an output configured to generate the denominator signal in response to a product of the first input of the second arithmetic operator and the second input of the second arithmetic operator; and a third arithmetic operator having a first input coupled to receive the signal representative of the number of primary turns of the energy transfer element, a second input coupled to receive the output voltage signal, a third input configured to be responsive to the secondary conduction time signal, and an output configured to generate the numerator signal in response to a product of the first input of the third arithmetic operator, the second input of the third arithmetic operator, and the third input of the third arithmetic operator.

Example 7. The controller of any one of examples 1 to 6, wherein the controller is further configured to receive a mode signal having a first logic level or a second logic level, and wherein the first logic level is representative of the controller operating in a first mode and the second logic level is representative of the controller operating in a second mode.

Example 8. The controller of any one of examples 1 to 7, wherein the first mode is a quasi-resonant mode and the second mode is a zero-voltage switching mode.

Example 9. The controller of any one of examples 1 to 8, wherein the timer control circuit further comprises a second latch coupled to be set in response to the request signal and reset in response to the winding signal increasing above the output voltage signal; a third latch coupled to be set in response to an inverted output of the second latch and reset in response to the winding signal falling below the output voltage signal; a first AND gate having a first input coupled to receive the mode signal and a second input coupled to an output of the first latch; a second AND gate having a first input coupled to an output of the third latch and a second input coupled to receive an inverted mode signal; and an OR gate have a first input coupled to an output of the first AND gate and a second input coupled to an output of the second AND gate, wherein the control signal is coupled to be responsive to an output of the OR gate.

Example 10. The controller of any one of examples 1 to 9, wherein the input voltage calculator further comprises a fourth arithmetic operator having a first input coupled to receive the inverted mode signal and a second input coupled to receive a zero voltage set up time signal, wherein an output of the fourth arithmetic operator is a product of the first input of the fourth arithmetic operator and the second input of the fourth arithmetic operator; and a fifth arithmetic operator having a first input coupled to receive the secondary conduction time signal and a second input coupled the output of the fourth arithmetic operator, wherein an output of fifth arithmetic operator is a sum off the first input of the fifth arithmetic operator and the second input of the fifth arithmetic operator, wherein the output of the fifth arithmetic operator is coupled to the third input of the third arithmetic operator.

Example 11. The controller of any one of examples 1 to 10, wherein the zero voltage set up time is representative of a duration of time that the energy transfer element is energized.

Example 12. The controller of any one of examples 1 to 11, wherein the control signal is coupled to transition to the first logic level in response to the request event in the request signal to turn on the power switch, and wherein the control signal is coupled to transition to the second logic level in response to the winding signal falling below the output voltage signal after the request event when the timer control circuit is operating in the first mode.

Example 13. The controller of any one of examples 1 to 12, wherein the control signal is coupled to transition to the first logic level in response to the winding signal increasing above the output voltage signal after the request event in the request signal, and wherein the control signal is coupled to transition to the second logic level in response to the winding signal falling below the output voltage signal after the request event when the timer control circuit is operating in the second mode.

Example 14. An input voltage estimate circuit for use in a power converter, wherein the input voltage estimate circuit comprises a timer, the timer comprising a timer control circuit configured to generate a control signal in response to a request signal representative of a request to turn on a power switch coupled to an input winding of an energy transfer element of the power converter, a winding signal representative of an output winding of the energy transfer element of the power converter, and an output voltage signal representative of an output voltage of power converter, wherein the control signal is coupled to transition to a first logic level in response to a request event in the request signal to turn on the power switch, and wherein the control signal is coupled to transition to a second logic level in response to the winding signal falling below the output voltage signal after the request event; a primary conduction timer configured to generate a primary conduction time signal in response to the first logic level and the second logic level in the control signal; and a secondary conduction timer configured to generate a secondary conduction time signal in response to the second logic level in the control signal and a second logic level in a second drive signal responsive to the winding signal.

Example 15. The input voltage estimate circuit of example 14, further comprising an input voltage calculator, the input voltage calculator comprising a first arithmetic operator having a first input coupled to receive a numerator signal, a second input coupled to receive a denominator signal, and an output configured to generate an input voltage estimate of an input voltage of the power converter in response to a quotient of the first input of the first arithmetic operator and the second input of the first arithmetic operator; a second arithmetic operator having a first input coupled to receive the primary conduction time signal, a second input coupled to receive a secondary turns signal representative of a number of turns of the output winding of the energy transfer element, and an output configured to generate the denominator signal in response to a product of the first input of the second arithmetic operator and the second input of the second arithmetic operator; and a third arithmetic operator having a first input coupled to receive a primary turns signal representative of a number of turns of the input winding of the energy transfer element, a second input coupled to receive the output voltage signal, a third input coupled to be responsive to the secondary conduction time signal, and an output configured to generate the numerator signal in response to a product of the first input of the third arithmetic operator, the second input of the third arithmetic operator, and the third input of the third arithmetic operator.

Example 16. The input voltage estimate circuit of example 14 or 15, wherein the input voltage estimate circuit is further configured to receive a mode signal having a first logic level or a second logic level, wherein the first logic level is representative of the power converter operating in a first mode and the second logic level is representative of the power converter operating in a second mode.

Example 17. The input voltage estimate circuit of any one of examples 14 to 16, wherein the first mode is a quasi-resonant mode and the second mode is a zero-voltage switching mode.

Example 18. The input voltage estimate circuit of any one of examples 14 to 17, wherein when the power converter is operating in the first mode, the timer control circuit is configured to generate the control signal to transition to the first logic level in response to the request event in the request signal to turn on the power switch, and wherein the timer control circuit is configured to generate the control signal to transition to the second logic level in response to the winding signal falling below the output voltage signal after the request event in the request signal.

Example 19. The input voltage estimate circuit of any one of examples 14 to 18 wherein when the power converter is operating in the second mode, the timer control circuit is configured to generate the control signal to transition to the first logic level in response to the winding signal increasing above the output voltage signal after the request event in the request signal, wherein the timer control circuit is configured to generate the control signal to transition to the second logic level in response to the winding signal falling below the output voltage signal after the request event in the request signal.

Example 20. The input voltage estimate circuit of any one of examples 14 to 19, wherein the input voltage calculator further comprises a fourth arithmetic operator having a first input coupled to receive an inverted mode signal and a second input coupled to receive a zero voltage set up signal, wherein an output of the fourth arithmetic operator is a product of the first input of the fourth arithmetic operator and the second input of the fourth arithmetic operator, and wherein the zero voltage set up signal is representative of a duration of time that the energy transfer element is energized; and a fifth arithmetic operator having a first input coupled to receive the secondary conduction time signal and a second input coupled the output of the fourth arithmetic operator, wherein an output of fifth arithmetic operator is a sum off the first input of the fifth arithmetic operator and the second input of the fifth arithmetic operator, and wherein the output of the fifth arithmetic operator is coupled to the third input of the third arithmetic operator.

Example 21. The input voltage estimate circuit of any one of examples 14 to 20, wherein the timer is included in a second controller of a plurality of controllers included in the power converter.

Example 22. The input voltage estimate circuit of any one of examples 14 to 21, wherein the input voltage calculator is included in a third controller of the plurality of controllers included in the power converter, and wherein the third controller is coupled to the second controller through an inter-integrated bus.

What is claimed is:

1. A controller for use in a power converter, comprising:
a synchronous rectifier (SR) control and request circuit coupled to be responsive to a winding signal representative of an output winding voltage of an energy transfer element of the power converter,
   wherein the SR control and request circuit is configured to generate a second drive signal in response to the winding signal, and a request signal in response to a feedback signal representative of an output of the power converter,
   wherein a power switch coupled to an input winding of the energy transfer element is configured to be turned on in response to the request signal and wherein an output rectifier coupled to the output winding is configured to be controlled in response to the second drive signal; and
an input voltage estimate circuit coupled to the SR control and request circuit to receive the second drive signal and the request signal,
   wherein the input voltage estimate circuit is further coupled to receive the winding signal and an output voltage signal representative of an output voltage of the power converter, and
   wherein the input voltage estimate circuit is configured to generate an input voltage estimate of an input voltage of the power converter in response to a signal representative of a number of primary turns of the energy transfer element, a signal representative of a number of secondary turns of the energy transfer element, the output voltage signal, a primary conduction time signal representative of the power switch conduction and a secondary conduction time signal representative of the output rectifier conduction, and
   wherein the input voltage estimate circuit determines the primary conduction time signal and the secondary conduction time signal in response to the winding signal, the second drive signal, the output voltage signal, and the request signal.

2. The controller of claim 1, wherein the input voltage estimate circuit comprises a timer, the timer comprising:
a timer control circuit configured to generate a control signal in response to the request signal, the winding signal, and the output voltage signal,
   wherein the control signal is coupled to transition to a first logic level in response to a request event in the request signal to turn on the power switch, and
   wherein the control signal is coupled to transition to a second logic level in response to the winding signal falling below the output voltage signal after the request event;

a primary conduction timer configured to generate the primary conduction time signal in response to the first logic level and the second logic level in the control signal; and
a secondary conduction timer configured to generate the secondary conduction time signal in response to the second logic level in the control signal and a second logic level in the second drive signal.

3. The controller of claim 2, wherein the controller further includes a comparator coupled to compare the winding signal and the output voltage signal, wherein the timer control circuit is coupled to an output of the comparator.

4. The controller of claim 3, wherein the timer control circuit includes a first latch coupled to be set in response to the request signal and reset in response to the winding signal falling below the output voltage signal, and wherein the control signal is coupled to be responsive to an output of the first latch.

5. The controller of claim 4, wherein the input voltage estimate circuit further comprises an input voltage calculator configured to generate the input voltage estimate in response to the primary conduction time signal, the secondary conduction time signal, the output voltage signal, the number of primary turns of the energy transfer element, and the number of secondary turns of the energy transfer element.

6. The controller of claim 5, wherein the input voltage calculator comprises:
a first arithmetic operator having a first input coupled to receive a numerator signal, a second input coupled to receive a denominator signal, and an output configured to generate the input voltage estimate in response to a quotient of the first input of the first arithmetic operator and the second input of the first arithmetic operator;
a second arithmetic operator having a first input coupled to receive the primary conduction time signal, a second input coupled to receive the signal representative of the number of secondary turns of the energy transfer element, and an output configured to generate the denominator signal in response to a product of the first input of the second arithmetic operator and the second input of the second arithmetic operator; and
a third arithmetic operator having a first input coupled to receive the signal representative of the number of primary turns of the energy transfer element, a second input coupled to receive the output voltage signal, a third input configured to be responsive to the secondary conduction time signal, and an output configured to generate the numerator signal in response to a product of the first input of the third arithmetic operator, the second input of the third arithmetic operator, and the third input of the third arithmetic operator.

7. The controller of claim 6, wherein the controller is further configured to receive a mode signal having a first logic level or a second logic level, and wherein the first logic level is representative of the controller operating in a first mode and the second logic level is representative of the controller operating in a second mode.

8. The controller of claim 7, wherein the first mode is a quasi-resonant mode and the second mode is a zero-voltage switching mode.

9. The controller of claim 7, wherein the timer control circuit further comprises:
a second latch coupled to be set in response to the request signal and reset in response to the winding signal increasing above the output voltage signal;

a third latch coupled to be set in response to an inverted output of the second latch and reset in response to the winding signal falling below the output voltage signal;

a first AND gate having a first input coupled to receive the mode signal and a second input coupled to an output of the first latch;

a second AND gate having a first input coupled to an output of the third latch and a second input coupled to receive an inverted mode signal; and an OR gate have a first input coupled to an output of the first AND gate and a second input coupled to an output of the second AND gate, wherein the control signal is coupled to be responsive to an output of the OR gate.

10. The controller of claim 9, wherein the input voltage calculator further comprises:

a fourth arithmetic operator having a first input coupled to receive the inverted mode signal and a second input coupled to receive a zero voltage set up time signal, wherein an output of the fourth arithmetic operator is a product of the first input of the fourth arithmetic operator and the second input of the fourth arithmetic operator; and a fifth arithmetic operator having a first input coupled to receive the secondary conduction time signal and a second input coupled the output of the fourth arithmetic operator, wherein an output of fifth arithmetic operator is a sum off the first input of the fifth arithmetic operator and the second input of the fifth arithmetic operator, wherein the output of the fifth arithmetic operator is coupled to the third input of the third arithmetic operator.

11. The controller of claim 10, wherein the zero voltage set up time is representative of a duration of time that the energy transfer element is energized.

12. The controller of claim 7, wherein the control signal is coupled to transition to the first logic level in response to the request event in the request signal to turn on the power switch, and wherein the control signal is coupled to transition to the second logic level in response to the winding signal falling below the output voltage signal after the request event when the timer control circuit is operating in the first mode.

13. The controller of claim 7, wherein the control signal is coupled to transition to the first logic level in response to the winding signal increasing above the output voltage signal after the request event in the request signal, and wherein the control signal is coupled to transition to the second logic level in response to the winding signal falling below the output voltage signal after the request event when the timer control circuit is operating in the second mode.

14. An input voltage estimate circuit for use in a power converter, wherein the input voltage estimate circuit comprises a timer, the timer comprising:

a timer control circuit configured to generate a control signal in response to a request signal representative of a request to turn on a power switch coupled to an input winding of an energy transfer element of the power converter, a winding signal representative of an output winding of the energy transfer element of the power converter, and an output voltage signal representative of an output voltage of power converter, wherein the control signal is coupled to transition to a first logic level in response to a request event in the request signal to turn on the power switch, and wherein the control signal is coupled to transition to a second logic level in response to the winding signal falling below the output voltage signal after the request event;

a primary conduction timer configured to generate a primary conduction time signal in response to the first logic level and the second logic level in the control signal; and a secondary conduction timer configured to generate a secondary conduction time signal in response to the second logic level in the control signal and a second logic level in a second drive signal responsive to the winding signal.

15. The input voltage estimate circuit of claim 14, further comprising an input voltage calculator, the input voltage calculator comprising:

a first arithmetic operator having a first input coupled to receive a numerator signal, a second input coupled to receive a denominator signal, and an output configured to generate an input voltage estimate of an input voltage of the power converter in response to a quotient of the first input of the first arithmetic operator and the second input of the first arithmetic operator;

a second arithmetic operator having a first input coupled to receive the primary conduction time signal, a second input coupled to receive a secondary turns signal representative of a number of turns of the output winding of the energy transfer element, and an output configured to generate the denominator signal in response to a product of the first input of the second arithmetic operator and the second input of the second arithmetic operator; and a third arithmetic operator having a first input coupled to receive a primary turns signal representative of a number of turns of the input winding of the energy transfer element, a second input coupled to receive the output voltage signal, a third input coupled to be responsive to the secondary conduction time signal, and an output configured to generate the numerator signal in response to a product of the first input of the third arithmetic operator, the second input of the third arithmetic operator, and the third input of the third arithmetic operator.

16. The input voltage estimate circuit of claim 15, wherein the input voltage estimate circuit is further configured to receive a mode signal having a first logic level or a second logic level, wherein the first logic level is representative of the power converter operating in a first mode and the second logic level is representative of the power converter operating in a second mode.

17. The input voltage estimate circuit of claim 16, wherein the first mode is a quasi-resonant mode and the second mode is a zero-voltage switching mode.

18. The input voltage estimate circuit of claim 16, wherein when the power converter is operating in the first mode, the timer control circuit is configured to generate the control signal to transition to the first logic level in response to the request event in the request signal to turn on the power switch, and wherein the timer control circuit is configured to generate the control signal to transition to the second logic level in response to the winding signal falling below the output voltage signal after the request event in the request signal.

19. The input voltage estimate circuit of claim 16, wherein when the power converter is operating in the second mode, the timer control circuit is configured to generate the control signal to transition to the first logic level in response to the winding signal increasing above the output voltage signal after the request event in the request signal, wherein the timer control circuit is configured to generate the control signal to transition to the second logic level in response to the winding signal falling below the output voltage signal after the request event in the request signal.

20. The input voltage estimate circuit of claim 16, wherein the input voltage calculator further comprises:
   a fourth arithmetic operator having a first input coupled to receive an inverted mode signal and a second input coupled to receive a zero voltage set up signal,
      wherein an output of the fourth arithmetic operator is a product of the first input of the fourth arithmetic operator and the second input of the fourth arithmetic operator, and
      wherein the zero voltage set up signal is representative of a duration of time that the energy transfer element is energized; and
   a fifth arithmetic operator having a first input coupled to receive the secondary conduction time signal and a second input coupled the output of the fourth arithmetic operator,
      wherein an output of fifth arithmetic operator is a sum off the first input of the fifth arithmetic operator and the second input of the fifth arithmetic operator, and
      wherein the output of the fifth arithmetic operator is coupled to the third input of the third arithmetic operator.

21. The input voltage estimate circuit of claim 16, wherein the timer is included in a second controller of a plurality of controllers included in the power converter.

22. The input voltage estimate circuit of claim 21, wherein the input voltage calculator is included in a third controller of the plurality of controllers included in the power converter, and wherein the third controller is coupled to the second controller through an inter-integrated bus.

* * * * *